US012744042B2

(12) United States Patent
Smith et al.

(10) Patent No.: US 12,744,042 B2
(45) **Date of Patent: *Sep. 22, 2026**

(54) INPUT DETECTION WINDOWING

(71) Applicant: Sonos, Inc., Goleta, CA (US)

(72) Inventors: Connor Kristopher Smith, New Hudson, MI (US); Matthew David Anderson, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/910,519

(22) Filed: Oct. 9, 2024

(65) Prior Publication Data

US 2025/0166625 A1 May 22, 2025

Related U.S. Application Data

(63) Continuation of application No. 18/316,434, filed on May 12, 2023, now Pat. No. 12,119,000, which is a (Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 3/167* (2013.01); *G10L 15/1815* (2013.01); *G10L 15/30* (2013.01); *G10L 25/51* (2013.01); *G10L 2015/088* (2013.01); *G10L 2015/223* (2013.01)

(58) Field of Classification Search
CPC ....... G10L 15/20; G10L 15/30; G10L 15/285; G10L 15/22; G10L 15/063; G10L 15/1815; G10L 25/51; G10L 2015/088; G10L 2015/223; G06F 3/167; G06F 3/165;
(Continued)

(56) References Cited

U.S. PATENT DOCUMENTS 9,361,885 B2 * 6/2016 Ganong, III ............ G10L 15/22
9,691,378 B1 * 6/2017 Meyers .................... G10L 15/04
(Continued)

FOREIGN PATENT DOCUMENTS

CA 3015496 C * 5/2019 ............. G10L 15/14
WO WO-2021237235 A1 * 11/2021 ............. G06F 3/167

*Primary Examiner* — Mohammad K Islam
(74) *Attorney, Agent, or Firm* — Fortem IP LLP

(57) ABSTRACT

A device, such as Network Microphone Device or a playback device, detecting an event associated with the device or a system comprising the device. In response, an input detection window is opened for a given time period. During the given time period the device is arranged to receive an input sound data stream representing sound detected by a microphone. The input sound data stream is analyzed for a plurality of keywords and/or a wake-word for a Voice Assistant Service (VAS) and, based on the analysis, it is determined that the input sound data stream includes voice input data comprising a keyword or a wake-word for a VAS. In response, the device takes appropriate action such as causing the media playback system to perform a command corresponding to the keyword or sending at least part of the input sound data stream to the VAS.

17 Claims, 13 Drawing Sheets

Related U.S. Application Data continuation of application No. 17/659,613, filed on Apr. 18, 2022, now Pat. No. 11,694,689, which is a continuation of application No. 16/879,553, filed on May 20, 2020, now Pat. No. 11,308,962.

(51) Int. Cl.

| | |
|---|---|
| ***G10L 15/08*** | (2006.01) |
| ***G10L 15/18*** | (2013.01) |
| ***G10L 15/30*** | (2013.01) |
| ***G10L 25/51*** | (2013.01) |

(58) Field of Classification Search

CPC ...... G06F 3/048; G06F 1/1643; G06F 3/0412; H04M 1/72533; H04R 1/083; H04R 27/00

See application file for complete search history.

(56) References Cited

U.S. PATENT DOCUMENTS

| | | | | |
|---|---|---|---|---|
| 9,781,532 | B2 * | 10/2017 | Sheen | H04R 29/007 |
| 10,777,189 | B1 * | 9/2020 | Fu | G10L 15/10 |
| 12,611,595 | B2 * | 4/2026 | Aman | A63F 13/25 |
| 2017/0269900 | A1 * | 9/2017 | Triplett | G06F 3/165 |
| 2019/0362714 | A1 * | 11/2019 | Mori | G10L 15/22 |
| 2020/0043494 | A1 * | 2/2020 | Maeng | E05F 15/70 |
| 2021/0157542 | A1 * | 5/2021 | De Assis | G06V 40/172 |
| 2021/0166680 | A1 * | 6/2021 | Jung | G10L 15/183 |
| 2021/0366476 | A1 * | 11/2021 | Smith | G06F 3/167 |

* cited by examiner

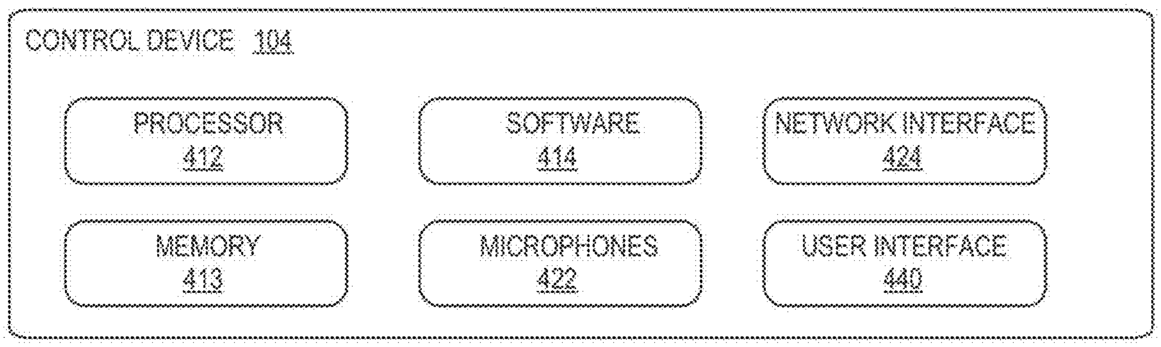

Fig. 4

540a
NOW PLAYING (Office)
Track Title
Artist Name
QUEUE
Track 1
Track 2
Track 3
Track 4
Music Source 1
Music Source 2
Music Source 3
First VAS
Second VAS
+ ADD Music source
+ ADD VAS source
Sonos
Browse
Rooms
Search music
544
546
548
542
541

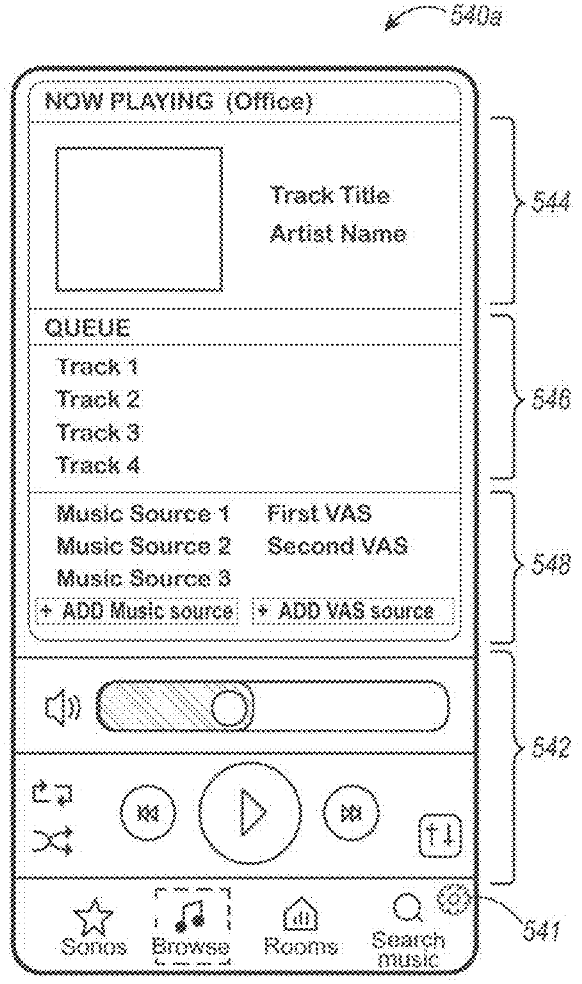

Fig. 5A

540b
No Music
Balcony
Group
Audio Component
Living Room
Living Room
Group
No Music
Dining Room
+ Kitchen
Group
No Music
Office
Group
Sonos
Browse
Rooms
Search music
543

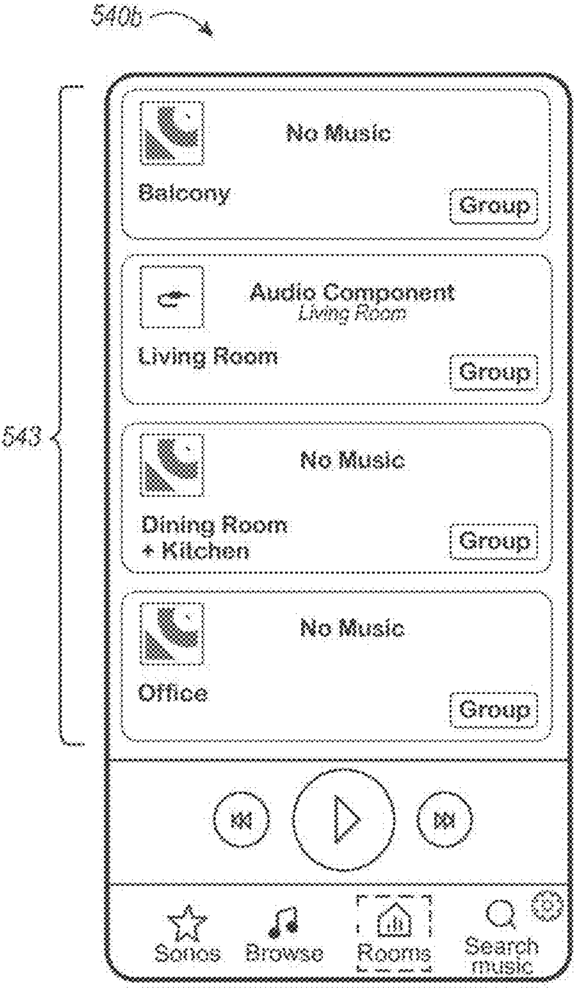

Fig. 5B

INPUT DETECTION WINDOWING

CROSS-REFERENCE TO RELATED APPLICATIONS

The present application is a continuation of U.S. patent application Ser. No. 18/316,434, filed May 12, 2023, now U.S. Pat. No. 12,119,000, which is a continuation of U.S. patent application Ser. No. 17/659,613, filed Apr. 18, 2022, now U.S. Pat. No. 11,694,689, which is a continuation of U.S. patent application Ser. No. 16/879,553, filed May 20, 2020, now U.S. Pat. No. 11,308,962, each of which is incorporated herein by reference in its entireties.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRA WINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

The drawings are for purposes of illustrating example embodiments, but it should be understood that the inventions are not limited to the arrangements and instrumentality shown in the drawings. In the drawings, identical reference numbers identify at least generally similar elements.

DETAILED DESCRIPTION

I. Overview

Figure 1A:
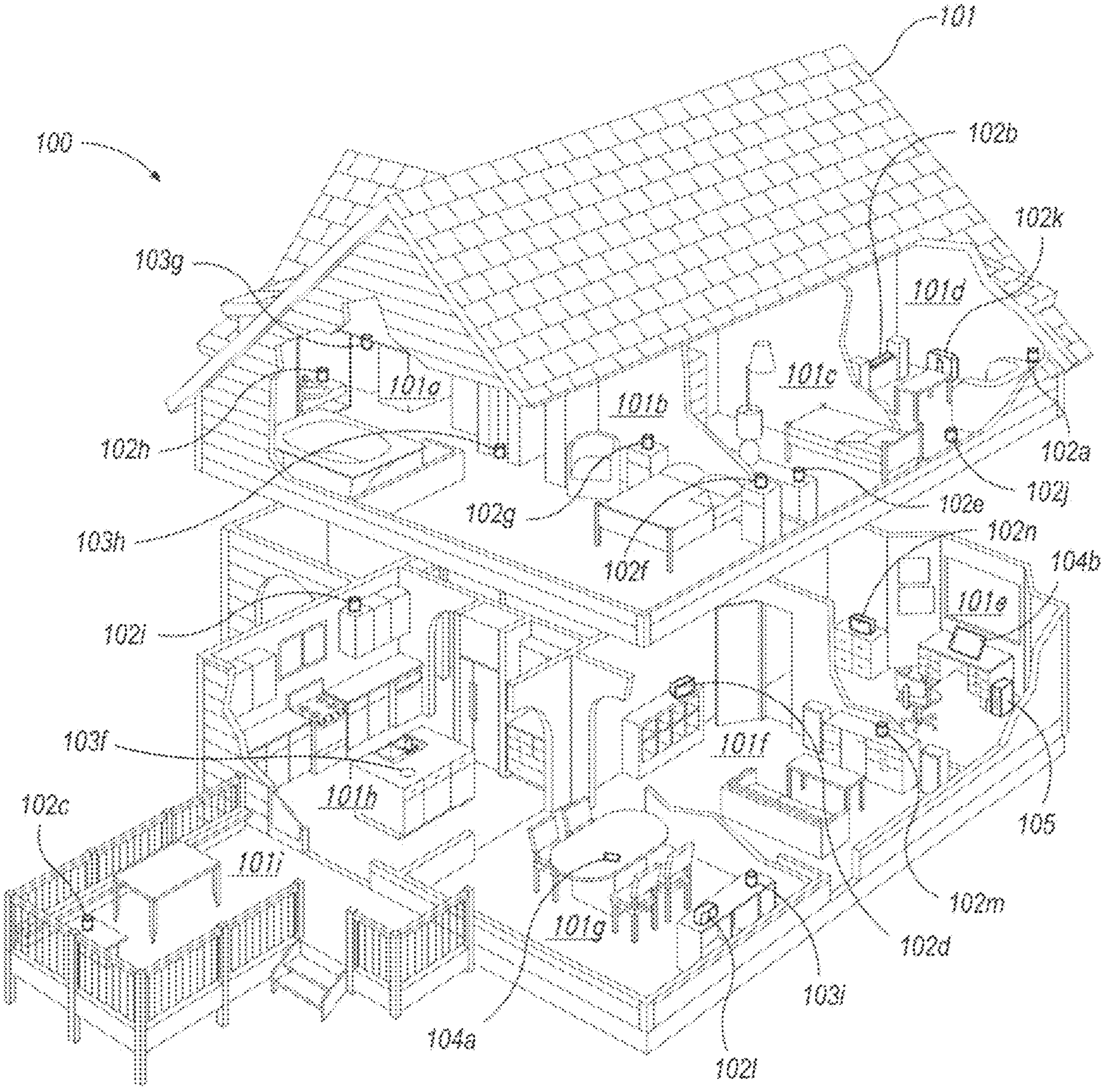
FIG. 1A is a partial cutaway view of an environment having a media playback system configured in accordance with aspects of the disclosed technology.

Example techniques described herein involve wake-word engines configured to detect commands. An example network microphone device ("NMD") may implement such a wake-word engine in parallel with a wake-word engine that invokes a voice assistant service ("VAS"). While a VAS wake-word engine may be involved with nonce wake-words, such as wake-words that do not have any particular meaning in themselves, a keyword engine is invoked with commands, such as "play" or "skip."

Network microphone devices may be used to facilitate voice control of smart home devices, such as wireless audio playback devices, illumination devices, appliances, and home-automation devices (e.g., thermostats, door locks, etc.). An NMD is a networked computing device that typically includes an arrangement of microphones, such as a microphone array, that is configured to detect sound present in the NMD's environment. In some examples, an NMD may be implemented within another device, such as an audio playback device.

A voice input to such an NMD will typically include a wake word followed by an utterance comprising a user request. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, "Hey, Siri" to invoke the APPLE® VAS, or "Hey, Sonos" to invoke a VAS offered by SONOS®, among other examples. In practice, a wake word may also be referred to as, for example, an activation-, trigger-, wakeup-word or phrase, and may take the form of any suitable word, combination of words (e.g., a particular phrase), and/or some other audio cue.

To identify whether sound detected by the NMD contains a voice input that includes a particular wake word, NMDs often utilize a wake-word engine, which is typically onboard the NMD. The wake-word engine may be configured to identify (i.e., "spot" or "detect") a particular wake word in recorded audio using one or more identification algorithms. Such identification algorithms may include pattern recognition trained to detect the frequency and/or time domain patterns that speaking the wake word creates. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present in the recorded audio.

When a wake-word engine detects a wake word in recorded audio, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. With a VAS wake-word engine, these additional processes may include extracting detected-sound data from a buffer, among other possible additional processes, such as outputting an alert (e.g., an audible chime and/or a light indicator) indicating that a wake word has been identified. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices.

When a VAS receives detected-sound data, the VAS processes this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

One challenge with traditional wake-word engines is that they can be prone to false positives caused by "false wake word" triggers. A false positive in the NMD context generally refers to detected sound input that erroneously invokes a VAS. With a VAS wake-work engine, a false positive may invoke the VAS, even though there is no user actually intending to speak a wake word to the NMD.

For example, a false positive can occur when a wake-word engine identifies a wake word in detected sound from audio (e.g., music, a podcast, etc.) playing in the environment of the NMD. This output audio may be playing from a playback device in the vicinity of the NMD or by the NMD itself. For instance, when the audio of a commercial advertising AMAZON's ALEXA service is output in the vicinity of the NMD, the word "Alexa" in the commercial may trigger a false positive. A word or phrase in output audio that causes a false positive may be referred to herein as a "false wake word."

In other examples, words that are phonetically similar to an actual wake word cause false positives. For example, when the audio of a commercial advertising LEXUS® automobiles is output in the vicinity of the NMD, the word "Lexus" may be a false wake word that causes a false positive because this word is phonetically similar to "Alexa." As other examples, false positives may occur when a person speaks a VAS wake word or a phonetically similar word in a conversation.

The occurrences of false positives are undesirable, as they may cause the NMD to consume additional resources or interrupt audio playback, among other possible negative consequences. Some NMDs may avoid false positives by requiring a button press to invoke the VAS, such as on the AMAZON FIRETV remote or the APPLE TV remote.

In contrast to a pre-determined nonce wake word that invokes a VAS, a keyword that invokes a command (referred to herein as a "keyword") may be a word or a combination of words (e.g., a phrase) that functions as a command itself, such as a playback command. In some implementations, a keyword may function as both a wake word and the command itself. That is, when a keyword engine detects a keyword in recorded audio, the NMD may determine that a keyword event has occurred and responsively perform a command corresponding to the detected keyword. For instance, based on detecting the keyword "pause," the NMD causes playback to be paused. One advantage of a keyword engine is that the recorded audio does not necessarily need to be sent to a VAS for processing, which may result in a quicker response to the voice input as well as increased user privacy, among other possible benefits. In some implementations described below, a detected keyword event may cause one or more subsequent actions, such as local natural language processing of a voice input. In some implementations, a keyword event may be one condition among one or more other conditions that must be detected before causing such actions.

According to example techniques described herein, a keyword is listened for and detected during a given time window, time period, listening window or input detection window. The given time period may be predetermined, set via a controller device, set on setup of a media playback system or playback device, or adaptive as a media playback system or playback device is used.

The time period may be triggered by a certain event or condition, including: reaching the end of a media item or track being played by the device or a media playback system comprising the device; opening of an application associated with the device or a system comprising the device, such a media control application for a media playback system, or a control application for another system comprising the device, as lighting and/or temperature control application; detecting the presence of a person proximate the device; detecting a connection of a new device to a system comprising the device, such as a smartphone or other computing device connecting to a WiFi Network. This may reduce false positives. For example, when a new audio track begins playing, it is more likely that a user will wish to interact with the system at this time. Accordingly, an activation window may be opened for a predetermined time period around the changing of a track or media item, enabling keywords to be received by the NMD, instead of continually listening for keywords. This enables keywords to be received and keyword events to be generated during the given time period without the need to continually listen for the keyword and possibly without relying on wake word event generation or user interaction to initiate the listening for a keyword.

In some examples, one or more wake-word detections remain invokable during the listening window in addition to directly acting on a keyword. In other words, a voice assistant can still be invoked during the listening window by preceding a command or keyword with a wakeword. The listening window may be applied to listening for interactions with a voice assistant, so that outside the listening window, the NMD is not listening for voice assistant wakewords, which may further reduce false positives and/or improve privacy. Some examples may listen for voice assistant wakewords but not keywords outside the listening window, so that a voice assistant remains continually available and false positives associated with keywords, which may be subject to a lower level of processing than voice assistant utterances, is reduced. In still other examples, during the listening window a voice assistant wakeword detector is disabled and only keywords are listened for, or some but not all voice assistant wakeword detectors are disabled during the listening window. This may allow local processing resources to be used most effectively during the listening window.

According to example techniques described herein, after detecting a keyword, example NMDs may generate a keyword event (and perform a command corresponding to the detected keyword) only when certain conditions corresponding to the detected keyword are met. For instance, after detecting the keyword "skip," an example NMD generates a keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the keyword event is not generated (and no skip is performed).

When keywords and/or VAS wake-words are detected during a given time period, privacy may also be improved because a device need not be continually listening. This can be especially beneficial for false-positives which are identified in the VAS processing, after the wake-word engine has sent data to the VAS for processing. While from a user perspective no false positive behavior is noticed, a recording may still be generated and stored by the VAS system, potentially on a cloud system or service outside of the user's control. Consider an NMD associated with a playback device or system which is currently inactive. Such devices tend to be continually listening, and may react to a false-positive wake-word in general conversation, as discussed above. This may involve storing a recording and/or sending data to a remote VAS server. While the VAS may partially mitigate the false-positive by recognizing it and taking no action, so that a user might not even notice that the false-positive occurred, data has nevertheless potentially been transmitted and/or stored which can reduce the privacy of a user.

For example, by requiring both (a) detection of a keyword and (b) certain conditions corresponding to the detected keyword before generating a keyword event, the prevalence of false positives may be reduced. For instance, when playing TV audio, dialogue or other TV audio would not have the potential to generate false positives for the "skip" keyword since the TV audio input is active (and not a queue).

Aspects of conditioning keyword events may also be applicable to VAS wake-word engines and other traditional nonce wake-word engines. For example, such conditioning can possibly make practicable other wake word engines in addition to keyword engines that might otherwise be prone to false positives. For instance, an NMD may include a streaming audio service wake word engine that supports certain wake words unique to the streaming audio service. For instance, after detecting a streaming audio service wake word, an example NMD generates a streaming audio service wake word event only when certain streaming audio service are met. These playback conditions may include, for example, (i) an active subscription to the streaming audio service and (ii) audio tracks from the streaming audio service in a queue, among other examples.

Further, a keyword may be a single word or a phrase. Phrases generally include more syllables, which generally make the keyword more unique and easier to identify by the keyword engine. Accordingly, in some cases, keywords that are phrases may be less prone to false positive detections. Further, using a phrase may allow more intent to be incorporated into the keyword. For instance, a keyword of "skip forward" signals that a skip should be forward in a queue to a subsequent track, rather than backward to a previous track.

Yet further, an NMD may include a local natural language unit (NLU). In contrast to an NLU implemented in one or more cloud servers that are capable of recognizing a wide variety of voice inputs, example local NLUs are capable of recognizing a relatively small library of keywords (e.g., 10,000 words and phrases), which facilitates practical implementation on the NMD. When the keyword engine generates a keyword event after detecting a keyword in a voice input, the local NLU may process a voice utterance portion of the voice input to look for keywords from the library and determine an intent from the found keywords.

If the voice utterance portion of the voice input includes at least one keyword from the library, the NMD may perform the command corresponding to the keyword according to one or more parameters corresponding to the least one keyword. In other words, the keywords may alter or customize the command corresponding to the keyword. For instance, the keyword engine may be configured to detect "play" as a keyword and the local NLU library could include the phrase "low volume." Then, if the user speaks "Play music at low volume" as a voice input, the keyword engine generates a keyword event for "play" and uses the keyword "low volume" as a parameter for the "play" command. Accordingly, the NMD not only causes playback based on this voice input, but also lowers the volume.

Example techniques involve customizing the keywords in the library to users of the media playback system. For instance, the NMD may populate the library using names (e.g., zone names, smart device names, and user names) that have been configured in the media playback system. Yet further, the NMD may populate the local NLU library with names of favorite playlists, Internet radio stations, and the like. Such customization allows the local NLU to more efficiently assist the user with voice commands. Such customization may also be advantageous because the size of the local NLU library can be limited.

One possible advantage of a local NLU is increased privacy. By processing voice utterances locally, a user may avoid transmitting voice recordings to the cloud (e.g., to servers of a voice assistant service). Further, in some implementations, the NMD may use a local area network to discover playback devices and/or smart devices connected to the network, which may avoid providing this data to the cloud. Also, the user's preferences and customizations may remain local to the NMD(s) in the household, perhaps only using the cloud as an optional backup. Other advantages are possible as well.

A first example implementation involves a device comprising at least one processor, at least one microphone configured to detect sound, and data storage. The data storage has instructions stored thereon that are executed by the at least one processor to cause the device to: detect an event associated with the device or a system comprising the device; and responsive to the event open an input detection window for a given time period or duration during which an input sound data stream is received from the at least one microphone. The input sound data stream represents sound detected by the at least one microphone and is analyzed by the at least one processor for a plurality of keywords supported by the device. The at least one processor then determines, based on the analysis, that the input sound data stream includes voice input data comprising a keyword; wherein the keyword is one of the plurality of keywords supported by the playback device; and responsive to the determining that the input sound data stream includes voice input data comprising a keyword, causes a command corresponding to the keyword to be performed.

The device may be a playback device comprising at least one speaker for outputting sound data, such as media obtained from a local library or a media content service such as SPOTIFY, PANDORA, AMAZON MUSIC, or APPLE MUSIC. Alternatively, the device may be an NMD capable of receiving voice input data, processing it and transmitting one or more commands to another device, such as a playback device, which forms part of the media playback system. The device may also be part of another system, such as a system of devices in communication with each other on a wireless local network (which may also comprise a media playback system), a home automation network and other similar systems The opening of an input detection window for a given time period, and within the time period monitoring for keywords, reduces the resource requirements for operating such a system. Components of the system required for natural language processing, such as the at least one microphone and a voice recognition component associated with the at least one process, as will be described below, are resource-intensive. Therefore, by allowing voice input to be detected and processed during an input detection window, the amount of time such resource-intensive components are active may be reduced. This is beneficial for portable devices which rely on battery power and more generally in reducing power requirements for all devices, for example by lowering a stand-by or idle power draw in a playback device which is not reproducing media. Furthermore, by detecting and processing voice input during an input detection window privacy for users may also be increased as the system is not continuously monitoring received sound.

Opening an input detection window when an event is detected or predicted enables voice input to be detected and processed when the likelihood of receiving such input is high. Examples of such events or predicted events include changes in the media content being output and the opening of a controller application on a control device associated with the device or a system comprising a device. For example, when it is known that a media item change is upcoming, that is a current media item being reproduced is approaching an end, it can be predicted that an event is imminent and as such, the input detection window may be opened before the event happens to anticipate potential user voice commands being received.

A length of the input detection window may be variable and can be determined based on user data as will be described below. Furthermore, the length of the input detection window may be static or dynamic. A static input detection window may have a predetermined length which might be set by a provider of the device or VAS or defined by a user in a setting or configuration data. A dynamic input detection window may be adjusted to reflect an actual use of the device or a given user's actual interaction with the device, as will be discussed in more detail below. In addition to being static or dynamic, the length of the input detection window may also be based on the type of event detected and/or predicted. For example, the input detection window may be longer when the controller application is opened than when a track or media item ends or changes. This may allow a user more time to fall back to a voice command if they find it difficult or time consuming to use the controller application to provide a desired command to the media playback system. In another example, the input detection window may be shorter when determining that a user is likely to want to decrease the volume of a media playback item. In such an example the input detection window may be open for the duration of a loud portion of music.

In yet a further example, where there is no media currently playing, but there are media playback items within a playback queue associated with the media playback system, the input detection window may be open and detection keywords may be based on an analysis of an input data stream. That is the device may assess the input data stream and determine a confidence value associated with a given portion of the input data stream. If the confidence value is above a predetermined threshold, then an analysis to determine what, if any, keywords are present within the portion of the input data stream. This analysis may be undertaken, as described below with reference to FIGS. 7A and 7B, based on a comparison with a library of known keywords, or based on an analysis using a natural language unit.

Furthermore, where a user has not interacted with the system or device for some time, such as by allowing a playlist to play out in full on a media playback system comprising the device, the length of the input detection window may be truncated or shortened. Given the user has not interacted with the system for some time it may be more likely they are wanting to listen to an entire playlist without interruption. As such, by limiting the length of the input detection window the likelihood of spurious voice commands being detected in the input data stream, causing an unwanted interruption, is reduced. In another example when a media playback system is currently playing a last or final media item of a playlist, the input detection window activated at the end of the media item may be modified, such as by extending the length of the window. This provides the user with a longer time period to issue a command and realize that there are no further tracks in the playlist for the media playback system to playback.

Some examples will transmit the input sound data received to a cloud service for further processing, and the input detection window may then be used to limit the interaction with a VAS. As such, wake-word interactions which require communication with a VAS, will be limited to the input detection window, potentially reducing the resource requirements, reducing false-positive data sent to the VAS and improving privacy. A reduction in false-positives may also have an impact on VAS resources because the volume of data sent to the VAS will be reduced as the false-positives are reduced.

The opening of an input detection window may impact other features of the media playback system, for example whilst the input detection window is open, other VASs may be disabled. In some examples only VASs which rely on a cloud service may be disabled whilst still permitting interaction with a local VAS built-in to the media playback system and which does not rely on an external cloud service. Additionally, and/or alternatively, interaction with the remote VAS may be disabled whilst content is playing as a result of an input received during the input detection window.

The device may comprise an internal library of keywords which are capable of being detected and capable of generating associated keyword events. Such keywords may be associated with a plurality of different commands including configuration commands, such as joining one or more zones of a media playback system together to reproduce media in synchrony, and control commands, such as controlling playback of media items. A subset of the keywords may be playback keywords which relate to the reproduction of media. Playback keywords include play, pause, skip between media items (forward or back), repeat, scrubbing within a media item (forward or back), searching within a media item (such as forward or back by a predetermined time period, e.g. 30 seconds, or to a specified time within a media item), volume change, mute and stop. These keywords may be detected and processed to generate corresponding playback command events during the input detection window, enabling interaction with the media playback system without the requirement to initiate a VAS using a wake word. This may reduce latency because there is no need to await results from a VAS.

If the system comprises a controller device, the detected event may comprise receiving a message from the controller device indicative of the event. This allows user interaction with a controller device to initiate an event or to comprise the event itself, and therefore open an input detection window. The user interaction may be at least one of launching a controller application on the controller device, selecting a next track, interacting with a playback queue via the controller device, and adjusting volume via the controller device. In another example, general interaction with a controller application, such as a user interacting via a touchscreen of the controller device to scroll through a list, or navigate menus of the controller application may cause the input detection window to open. An event message can be sent to the device from the controller device which causes the input detection window to open. The event message may comprise data indicative of the event, such as an associated event or the nature of the event itself, which can be useful when a length of the input detection window is based on what the event is. Alternatively, or additionally, the event message may comprise data indicative of a length of the event window, which can be useful when the length is determined or configured in the controller application. Numerous events, some of which have been described above may indicate or comprise an event, including but not limited to an indication of a track change associated with a playback queue output by the device or a media playback system comprising the device, receipt of a playback command from a controller device, receipt of a notification from a controller device that a control application associated with the media playback system has been opened; detection of an environmental change, and an interaction with a user interface element of the playback device, wherein the user interface element does not relate to activating a voice input. In this way, one or more different conditions can be used to indicate or comprise an event including characteristics relating to a playback queue, controller commands, the detection of changes in the environment such as the presence of a user, and user interface interactions such as interaction with buttons on the device itself. Examples of user interface elements that do not relate to activating input include those relating to at least one of playback control, a configuration of the media playback system, and a current status of the media playback system. Examples of user interface elements that do not relate to activating input include those relating to at least one of playback control, a configuration of the media playback system, and a current status of the media playback system.

The device may store historical data in the data storage. The historical data includes data associated with past events and associated commands. For example, a command may be associated with, e.g., a time/date stamp indicating the previous time(s) that a command has been detected and the corresponding event(s) resulting from a particular command. The historical data may then be analyzed to adjust the given time period associated with the input detection window. This allows the length of the input detection window to be adjusted based on previous user interactions. Furthermore, the length of the input detection window may be adjusted according to particular events for example, when the event is a track change the input detection window may be opened for a first time period, whereas when the event is opening of a controller application on a controller device, the input detection window may be opened for a second time period, which can be different from the first time period.

When analyzing the historical data, a frequency of the associated commands may be determined along with a time period, relative to a time of the event, during which the associated playback commands were received by the media playback system, and the given time period set according to that frequency. This enables the time period that the input detection window is open for to be based on usage data associated with device or system comprising the device. For example how quickly and how often user actions were received previously when a similar event was detected. For example, the analysis may be based on assuming a normal distribution of the commands received, determining the mean and standard deviation from the historical data, setting a center of the input window as the mean, setting a start time of the input window as a first predetermined factor of the standard deviation before the mean, and setting an end time of the input window as a second predetermined factor of the standard deviation after the means. The first and second factor may be the same or different and may be fractions or integers. In one example, the first and second factor both equal 1. It will be appreciated that other statistical distributions can be used as well as the normal distribution. In other examples, at least one of the open time, end time and duration of the input window may be based on thresholds, for example an end time may be set as when greater than or equal to 60%, 70%, 80% or 90% of the commands have been received following the event.

Some examples may consider a maximum time period or duration for the input window, such as 30 seconds or 1 minute. This can help to maintain relatively short windows for improved privacy and reduced false positives and resource requirements. Where a maximum duration is reached the window may be centered on mean value which, assuming a normal distribution, can help to maximize the probability of receiving a user command in the window. Other examples may set a fixed time period or duration for the input window and center it on a mean value of the historical data. The maximum time periods and/or durations may be stored locally on the playback device or within the playback system, or may be stored in the cloud storage associated with a user account. The user may indicate a preference as to whether the time period/duration information is stored locally or within the cloud. Optionally, when uploading to a cloud service the information may be anonymized to increase privacy.

In some examples, the given time period is associated with a user account of the device or a system comprising the device enabling the time period to be customized according to a particular account. To facilitate this, the historical data may also include data of respective user accounts associated with the commands. This may allow the experience of each individual user to be customized, enabling multiple users of the same system have their own respective input window time periods rather all user interaction with the media playback system being considered as a whole. Where the user account is also used with other media playback systems, it can allow the given time period to be shared across different systems. In yet further examples, the user account may be used to store preferences of a minimum and/or maximum time period for the input detection window to enhance privacy or improve recognition of commands. Furthermore, the user account may be used to store a voice profile of the user which can be used by the device to determine which user is providing the input voice data automatically and adjust the given time period accordingly.

Outside the input detection window, the input sound data stream may not be analyzed. This ensures that privacy is maintained, and that resource-intensive components of the device are not operable thereby increasing the efficiency of the device.

The device may comprise a network interface, and the data storage may comprise instructions which cause the transmission, via the network interface, of at least part of the input sound data to an external device for analysis during the input detection window. The external device may be a remote server. Data including a remote command may then be received from the remote server which represents commands supported by the device, which are then used to cause the media playback to perform the remote command. As mentioned above this enables the input sound data stream to be analyzed by a remote server such as a VAS to enable other commands to be actions, such as commands which are not present in a local library associated with the local command analysis unit. The data provided to the external device may include other information such as track details, or device identifiers. Furthermore, the input sound data stream may be first analyzed to determine which portions are unable to be processed locally, only those sections may then be sent to the external device for further processing. It will be appreciated that the external device may be on the same local area network as the device. For example, the system may comprise a device which functions as a VAS for the playback system. Alternatively, or additionally, the external device may be provided as part of a controller application running on a controller device. Controller applications may be run on devices with relatively more computing power than a media playback device.

Analyzing the input data stream may comprise determining a keyword using at least one of natural language processing to determine intent based on an analysis of the command, and pattern matching based on a predefined library of keywords. In some examples, a decision whether to use natural language processing, pattern matching, or both natural language processing and pattern matching may be based on properties of the device and/or where the input data stream will be processed. Example device properties include available processing resources and available memory resources. Examples of where the input data stream will be processed include by the device itself or by a VAS external to the device.

A second example implementation involves a method to be performed by a device in which an event associated with the device or a system comprising the device is determined and an input detection window is opened for a given time period upon determining the event. During the given time period an input sound data stream, representing sound detected by at least one microphone, is received and analyzed for a plurality of keywords supported by the device. Based on the analysis it is determined that the input sound data stream includes voice data comprising a keyword which is one of the plurality of keywords supported by the device. In response to the determination, the device, or a system comprising the device, performs a command corresponding to the keyword.

A third example implementation involves a non-transitory computer-readable medium having instructions stored thereon that are executable by one or more processors to cause a device to perform functions, and the device comprising at least one microphone configured to detect sound. The functions comprise determining an event associated with a device or a system comprising the device, and opening an input detection window for a given time period upon determining the event. During the given time period an input sound data stream, representing sound detected by at least one microphone is received and analyzed for a plurality of keywords supported by the device. Based on the analysis it is determined that the input sound data stream includes voice data comprising a keyword which is one of the plurality of keywords supported by the playback device. In response to the determination, the device or a system comprising the device is caused to perform a command corresponding to the keyword.

It will be appreciated that the second and third example implementations can also use the features discussed above for the first example implementation.

In further examples, the input detection window is opened on a first device based on an event associated with a second device. That is the event may occur on a device which can not receive user inputs, and as such the input detection window may be opened on another device which forms part of the same system, thereby enabling user interaction with the system. For example a playback device may not be capable of receiving voice input, due to the lack of microphone hardware. When an event is detected, such as the transition from one track in a playlist to another track of the playlist, the playback device is unable to receive voice commands itself. However, the system comprises a second device, an NMD, which is capable of receiving voice input. As such, the input detection window may be opened and capable of receiving a voice input on the second device, thereby enabling voice interaction with, and voice command of, the system.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
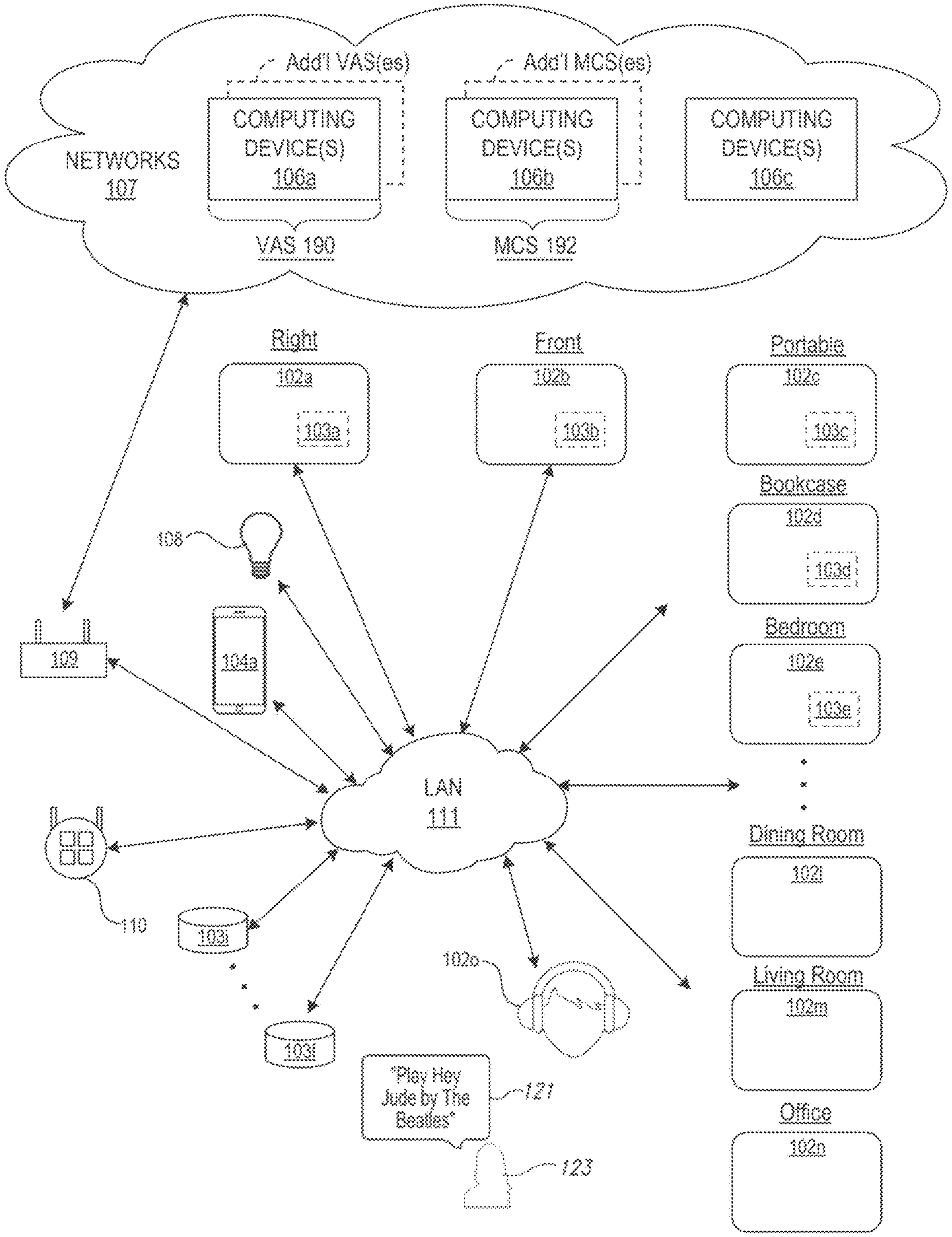
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-1020), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 1020 (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-c* include or are otherwise equipped with corresponding NMDs 103*a-c*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output). Similarly, the stand-alone playback device 102*a-e* may interpret any voice commands using an in-built processor and/or natural language module, thereby enabling the input voice data to be processed locally, and removing the need to transmit input voice data to a remote server for processing by a VAS.

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. It will be appreciated that in other examples the NMDs 103 are configured to process the detected sounds without interacting with the VAS 190 over a network. Interactions with the VAS 190 may be initiated, for example, when an NMD identifies in the detected sound a potential wake word, alternatively, interactions may be initiated based on the detection of a keyword in a given time period associated with an event of the media playback system. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Where the stream of sound data is sent to the VAS 190, upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In another example, upon receiving an input data stream, the playback device 102 or NMD 103 determines if there is voice input in the data stream and if so also determines an underlying intent in the voice input. As an example, in response to receiving a voice input with an utterance to "Play Hey Jude by The Beatles," the playback device 102 or the NMD 103 may determine that the underlying intent of the voice input is to initiate playback and further determine that intent of the voice input is to play the particular media item "Hey Jude." After these determinations, the content corresponding to the particular item is retrieved from data storage associated with the media playback system or from another content source, such as a media streaming service.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
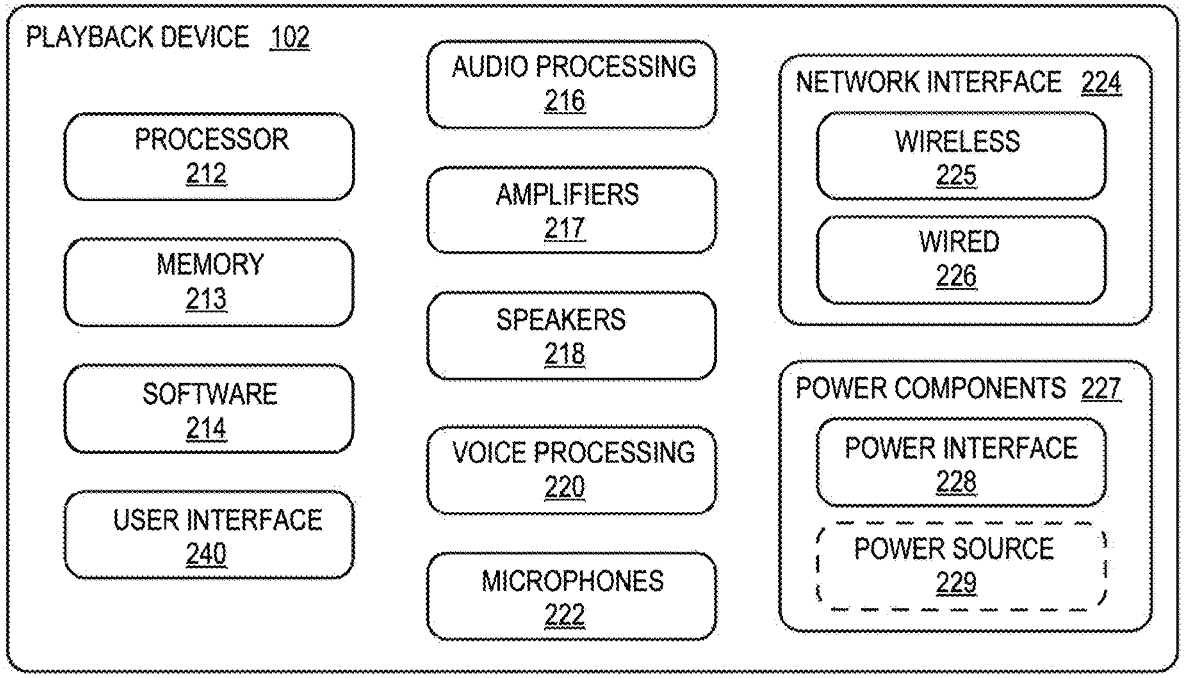
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG.

2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
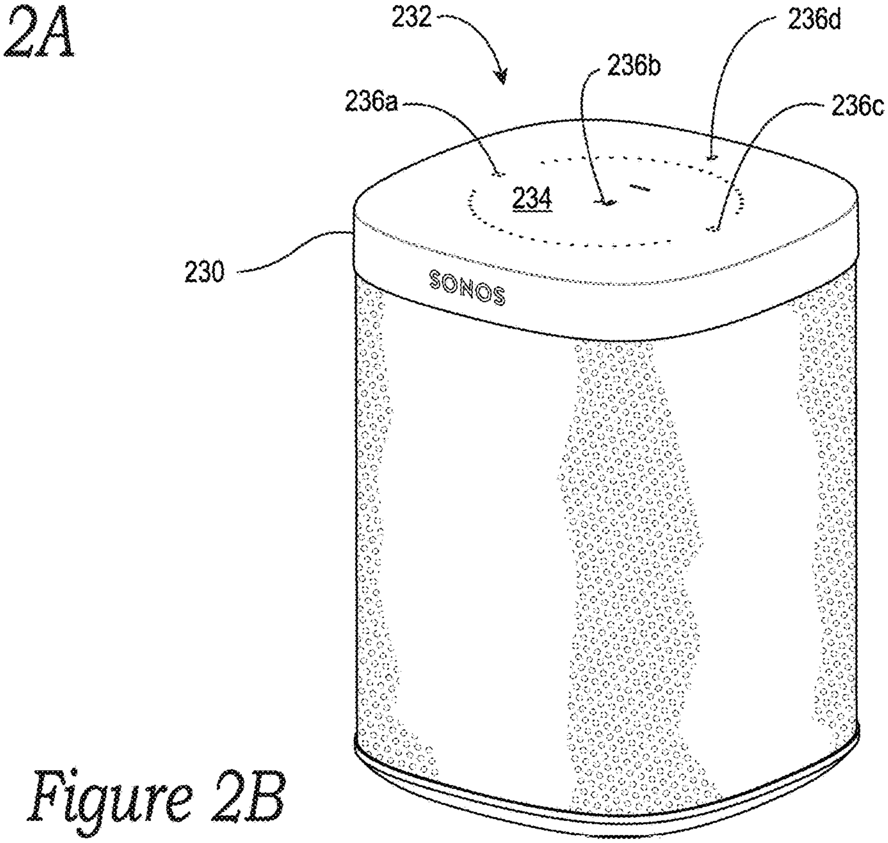
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY: 1," "PLAY: 3," "PLAY: 5," "PLAYBAR," "CONNECT: AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
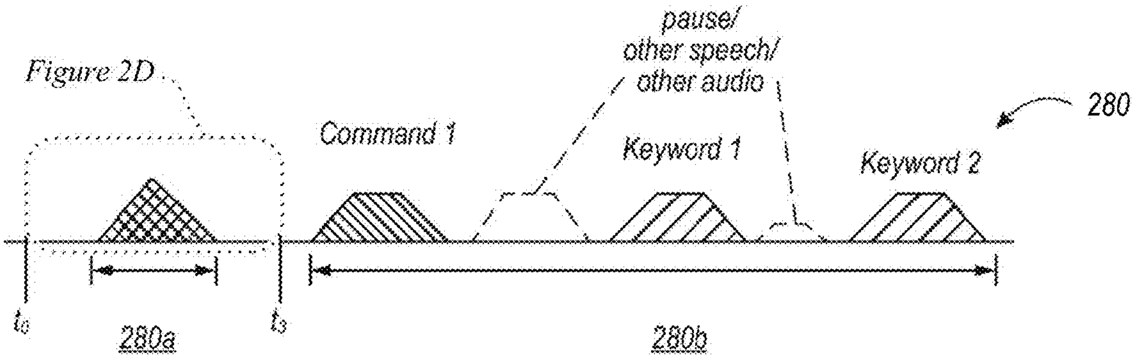
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word or a keyword. In the case of a wake word, the keyword portion 280*a* corresponds to detected sound that caused a wake-word. The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In other examples, an utterance portion 208*b* is processed to identify the presence of any words in detected sound data by the NMD during a given time period associated with a change in the state of the media playback system without first identifying a keyword portion. In various implementations, an underlying intent can be determined based on the words in the utterance portion 280*b*. In certain implementations, an underlying intent can also be based or at least partially based on certain words in the keyword portion 280*a*, such as when keyword portion includes a keyword. In any case, the words may correspond to one or more commands, as well as a certain command and certain keywords. A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
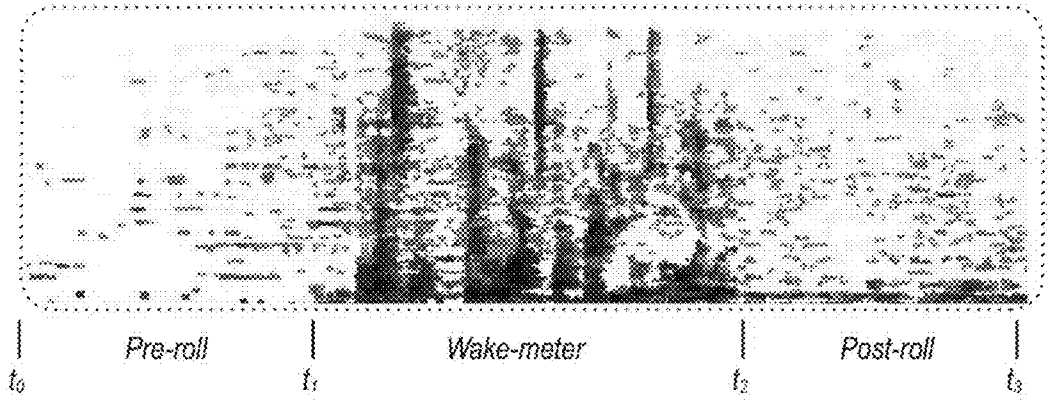
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or keyword in the keyword portion 280*a* of FIG. 2C. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for keyword detection may be tuned to accommodate a wide range of keywords (e.g., 5, 10, 100, 1,000, 10,000 keywords). Keyword detection, in contrast to wake-word detection, may involve feeding ASR output to an onboard, local NLU which together with the ASR determine when command word events have occurred. In some implementations described below, the local NLU may determine an intent based on one or more other keywords in the ASR output produced by a particular voice input. In these or other implementations, a playback device may act on a detected keyword event only when the playback devices determines that certain conditions have been met, such as environmental conditions (e.g., low background noise).

b. Example Playback Device Configurations

Figure 3B:
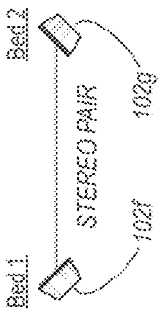
FIGS. 3A, 3B, 3C, 3D and 3E are diagrams showing example playback device configurations in accordance with aspects of the disclosure.
Figure 3C:
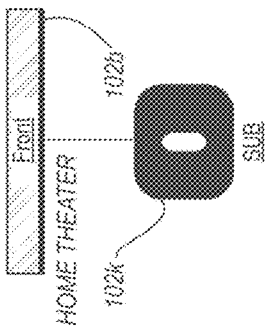
Figure 3D:
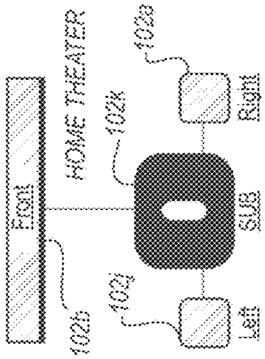
Figure 3E:
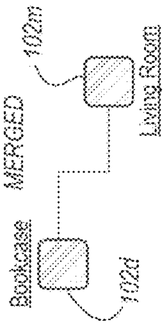
Figure 3A:
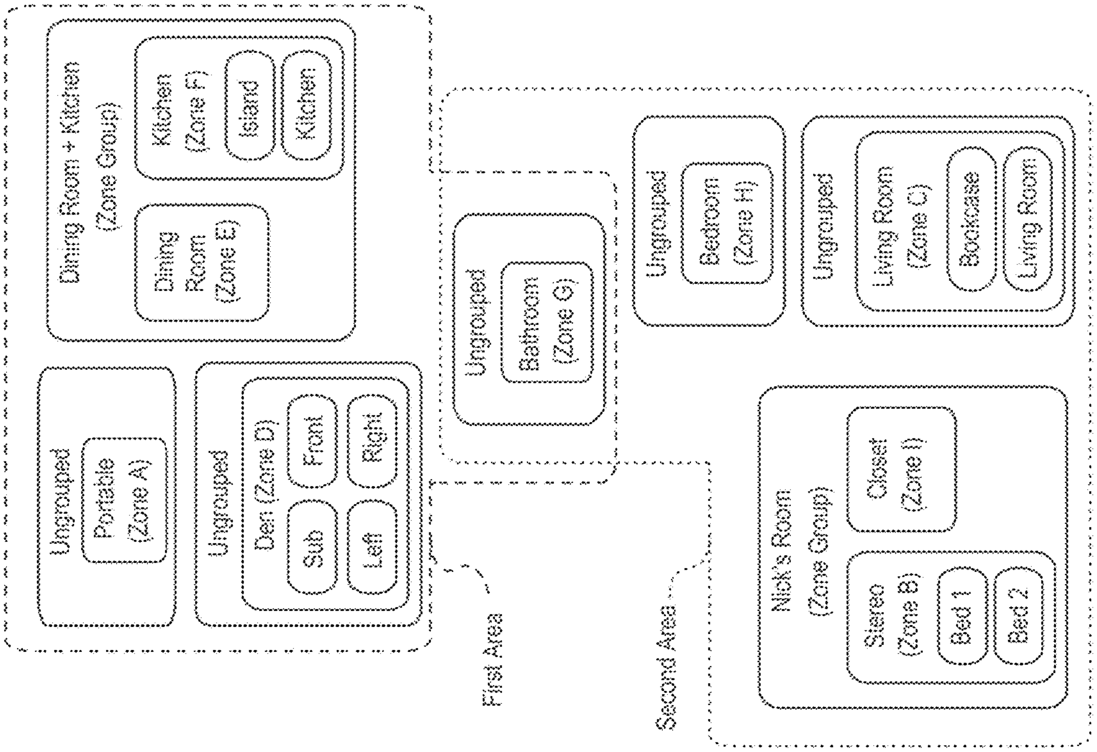

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102_m_. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102_f_ in the master bedroom 101_h_ (FIG. 1A) and the Bed 2 device may be the playback device 102_g_ also in the master bedroom 101_h_ (FIG. 1A).

As noted above, playback devices that are bonded may have different playback responsibilities, such as playback responsibilities for certain audio channels. For example, as shown in FIG. 3B, the Bed 1 and Bed 2 devices 102_f_ and 102_g_ may be bonded so as to produce or enhance a stereo effect of audio content. In this example, the Bed 1 playback device 102_f_ may be configured to play a left channel audio component, while the Bed 2 playback device 102_g_ may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102_b_ named "Front" may be bonded with the playback device 102_k_ named "SUB." The Front device 102_b_ may render a range of mid to high frequencies, and the SUB device 102_k_ may render low frequencies as, for example, a subwoofer. When unbonded, the Front device 102_b_ may be configured to render a full range of frequencies. As another example, FIG. 3D shows the Front and SUB devices 102_b_ and 102_k_ further bonded with Right and Left playback devices 102_a_ and 102_j_, respectively. In some implementations, the Right and Left devices 102_a_ and 102_j_ may form surround or "satellite" channels of a home theater system. The bonded playback devices 102_a_, 102_b_, 102_j_, and 102_k_ may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102_d_ and 102_m_ in the Living Room merged, which would result in these devices being represented by the single UI entity of Zone C. In one embodiment, the playback devices 102_d_ and 102_m_ may playback audio in synchrony, during which each outputs the full range of audio content that each respective playback device 102_d_ and 102_m_ is capable of rendering.

In some embodiments, a stand-alone NMD may be in a zone by itself. For example, the NMD 103_h_ from FIG. 1A is named "Closet" and forms Zone I in FIG. 3A. An NMD may also be bonded or merged with another device so as to form a zone. For example, the NMD device 103_f_ named "Island" may be bonded with the playback device 102_i_ Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "al" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102_a_, 102_b_, 102_j_, and 102_k_. Identifiers associated with the Dining Room may indicate that the Dining Room is part of Dining Room+Kitchen group and that devices 103_f_ and 102_i_ are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone.

For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

C. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
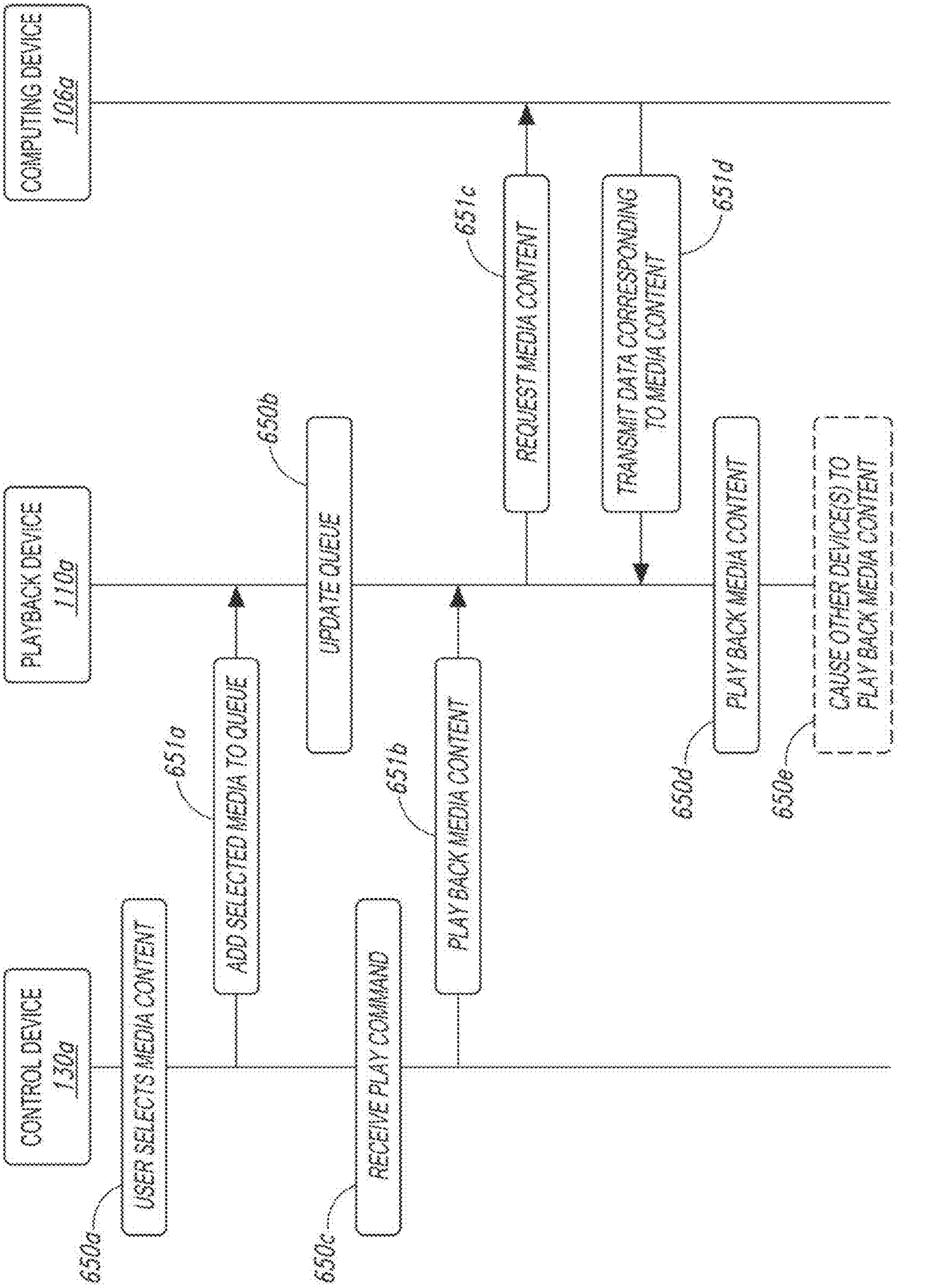
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Keyword Eventing

Figure 7A:
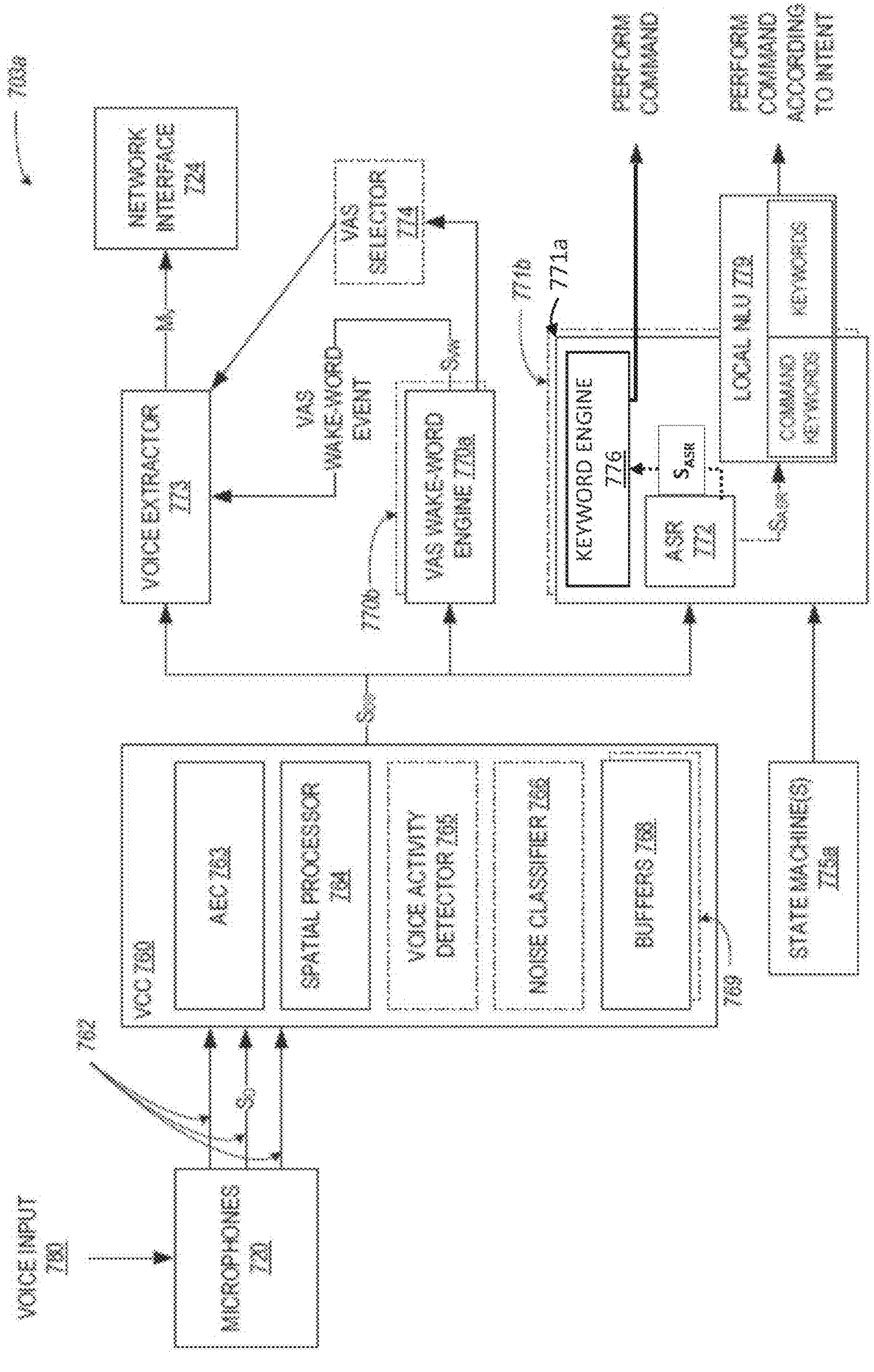
FIG. 7A is a functional block diagram of certain components of a first example network microphone device in accordance with aspects of the disclosure.
Figure 7B:
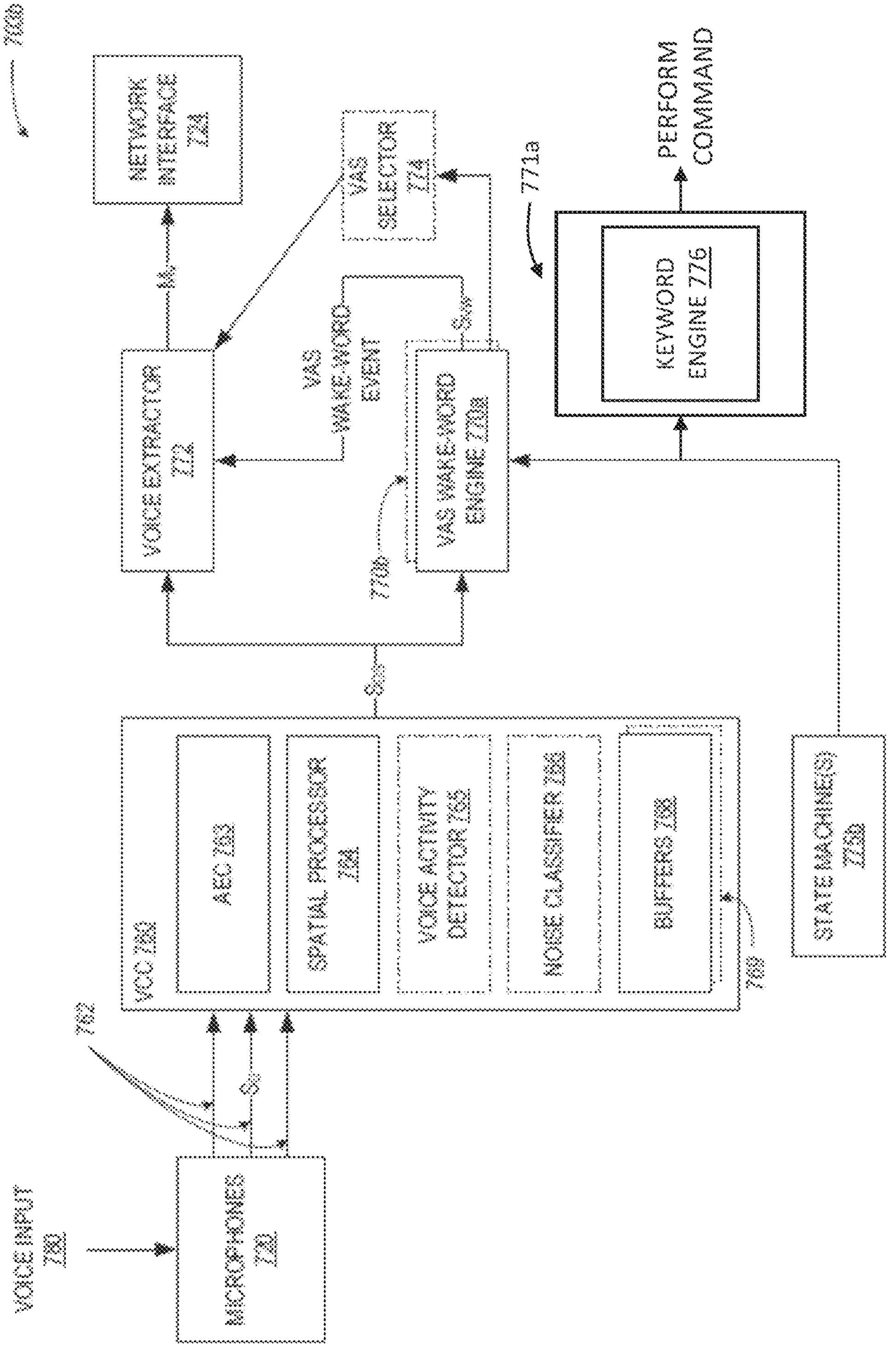
FIG. 7B is a functional block diagram of certain components of a second example network microphone device in accordance with aspects of the disclosure.

FIGS. 7A and 7B are functional block diagrams showing aspects of an NMD 703*a* and an NMD 703 configured in accordance with embodiments of the disclosure. The NMD 703*a* and NMD 703*b* are referred to collectively as the NMD 703. The NMD 703 may be generally similar to the NMD 103 and include similar components. As described in more detail below, the NMD 703*a* (FIG. 7A) is configured to handle certain voice inputs locally, without necessarily transmitting data representing the voice input to a voice assistant service. However, the NMD 703*a* is also configured to process other voice inputs using a voice assistant service. The NMD 703*b* (FIG. 7B) is configured to process voice inputs using a voice assistant service and may have limited or no local NLU or keyword detection.

Referring to FIG. 7A, the NMD 703 includes voice capture components ("VCC") 760, a VAS wake-word engine 770*a*, and a voice extractor 773. The VAS wake-word engine 770*a* and the voice extractor 773 are operably coupled to the VCC 760. The NMD 703*a* further comprises a window detector 771*a* operably coupled to the VCC 760. The VAS wake-word engine 770*a* may be omitted if the NMD 703 is arranged to process keywords automatically during a time period associated with an event of the NMD 702 without requiring the utterance of a VAS wake-word.

The NMD 703 further includes microphones 720 and the at least one network interface 720 as described above and may also include other components, such as audio amplifiers, a user interface, etc., which are not shown in FIG. 7A for purposes of clarity. The microphones 720 of the NMD 703*a* are configured to provide detected sound, Sp, from the environment of the NMD 703 to the VCC 760. The detected sound $S_D$ may take the form of one or more analog or digital signals. In example implementations, the detected sound $S_D$ may be composed of a plurality signals associated with respective channels 762 that are fed to the VCC 760.

Each channel 762 may correspond to a particular microphone 720. For example, an NMD having six microphones may have six corresponding channels. Each channel of the detected sound Sp may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 7A, the VCC 760 includes an AEC 763, a spatial processor 764, and one or more buffers 768. In operation, the AEC 763 receives the detected sound $S_D$ and filters or otherwise processes the sound to suppress echoes and/or to otherwise improve the quality of the detected sound Sp. That processed sound may then be passed to the spatial processor 764.

The spatial processor 764 is typically configured to analyze the detected sound $S_D$ and identify certain characteristics, such as a sound's amplitude (e.g., decibel level), frequency spectrum, directionality, etc. In one respect, the spatial processor 764 may help filter or suppress ambient noise in the detected sound $S_D$ from potential user speech based on similarities and differences in the constituent channels 762 of the detected sound Sp, as discussed above. As one possibility, the spatial processor 764 may monitor metrics that distinguish speech from other sounds. Such metrics can include, for example, energy within the speech band relative to background noise and entropy within the speech band-a measure of spectral structure-which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 213 (FIG. 2A)—capture data corresponding to the detected sound Sp. More specifically, the one or more buffers 768 capture detected-sound data that was processed by the upstream AEC 764 and spatial processor 766.

The network interface 724 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine-tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), Sps, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the VAS wake-word engines 770 and the voice extractor 773 of the NMD 703.

In some implementations, at least one buffer 768 captures detected-sound data utilizing a sliding window approach in which a given amount (i.e., a given window) of the most recently captured detected-sound data is retained in the at least one buffer 768 while older detected-sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 703 may process the sound-data stream Sps. For instance, the VAS wake-word engines 770 are configured to apply one or more identification algorithms to the sound-data stream $S_{DS}$ (e.g., streamed sound frames) to spot potential wake words in the detected-sound Sp. This process may be referred to as automatic speech recognition. The VAS wake-word engine 770*a* and event detector 771*a* may be configured to apply different identification algorithms corresponding to their respective wake words, and further generate different events based on detecting a wake word in the detected-sound $S_D$.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the VAS wake-word engine 770*a* detects a potential VAS wake word, the VAS work-word engine 770*a* provides an indication of a "VAS wake-word event" (also referred to as a "VAS wake-word trigger"). In the illustrated example of FIG. 7A, the VAS wake-word engine 770*a* outputs a signal, Svw, that indicates the occurrence of a VAS wake-word event to the voice extractor 773.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the VAS wake-word engine 770*a* and at least one additional VAS wake-word engine 770*b* (shown in dashed lines). In such implementations, the NMD 703 may include multiple, different VAS wake-word engines and/or voice extractors, each supported by a respective VAS.

Similar to the discussion above, each VAS wake-word engine 770 may be configured to receive as input the sound-data stream $S_{DS}$ from the one or more buffers 768 and apply identification algorithms to cause a wake-word trigger for the appropriate VAS. Thus, as one example, the VAS wake-word engine 770*a* may be configured to identify the wake word "Alexa" and cause the NMD 703*a* to invoke the AMAZON VAS when "Alexa" is spotted. As another example, the wake-word engine 770*b* may be configured to identify the wake word "Ok, Google" and cause the NMD 520 to invoke the GOOGLE VAS when "Ok, Google" is spotted. In single-VAS implementations, the VAS selector 774 may be omitted.

In response to the VAS wake-word event (e.g., in response to the signal Svw indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages $M_V$ sent from the NMD 703. More specifically, the NMD 703*a* is configured to identify a voice input 780 based on the sound-data stream $S_{DS}$. As described in connection with FIG. 2C, the voice input 780 may include a keyword portion and an utterance portion. The keyword portion corresponds to detected sound that caused a wake-word event, or leads to a command-keyword event when one or more certain conditions, such as certain playback conditions, are met. For instance, when the voice input 780 includes a VAS wake word, the keyword portion corresponds to detected sound that caused the wake-word engine 770*a* to output the wake-word event signal Svw to the voice extractor 773. The utterance portion in this case corresponds to detected sound that potentially comprises a user request following the keyword portion.

When a VAS wake-word event occurs, the VAS may first process the keyword portion within the sound-data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703*a* with an instruction for the NMD 703*a* to cease extraction of sound data, which causes the voice extractor 773 to cease further streaming of the detected-sound data to the VAS. The VAS wake-word engine 770*a* may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770*a* of the NMD 703 may resume or continue to monitor the sound-data stream $S_{DS1}$ until it spots another potential wake-word, as discussed above.

In general, the one or more identification algorithms that a particular VAS wake-word engine, such as the VAS wake-word engine 770*a*, applies are configured to analyze certain characteristics of the detected sound stream $S_{DS}$ and compare those characteristics to corresponding characteristics of the particular VAS wake-word engine's one or more particular VAS wake words. For example, the wake-word engine 770*a* may apply one or more identification algorithms to spot spectral characteristics in the detected sound stream $S_{DS}$ that match the spectral characteristics of the engine's one or more wake words, and thereby determine that the detected sound $S_D$ comprises a voice input including a particular VAS wake word.

In some implementations, the one or more identification algorithms may be third-party identification algorithms (i.e., developed by a company other than the company that provides the NMD 703*a*). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703*a* also includes an event detector 771*a* which may operate in parallel with the VAS wake-word engine 770*a*. The event detector 771*a* detects one or more events, based on a plurality of conditions. For example, events may include a track change, a user interaction such as launching a controller application on a controller device, selecting a next track, interacting with a playback queue via the controller device, and adjusting volume via the controller device. The event detector 771*a* may also detect other more general interactions with a controller application, such as a user interacting via a touchscreen of the controller device to scroll through a list, or navigate menus of the controller application. Once an event has been detected by the event detector 771*a* an input detection window may be opened. In some examples, where the event is associated with an interaction such as with a controller application, the event detector 771*a* opens an input detection window in which the NMD 703*a* is configured to listen for voice commands. The event detector 771*a* may comprise units for determining whether a keyword is comprised within a detected sound $S_D$. received during the input detection window, such as the keyword engine 776 and the local NLU 779. Like the VAS wake-word engine 770*a*, each unit 776, 779 may apply one or more identification algorithms corresponding to one or more keywords. A "keyword event" is generated when a particular keyword is identified in the detected-sound $S_D$. In contrast to the nonce words typically as utilized as VAS wake words, identified keywords function as both the activation word and the command itself. For instance, example keywords may correspond to playback commands (e.g., "play," "pause," "skip," etc.) as well as control commands ("turn on"), among other examples. Under appropriate conditions, based on detecting one of these keywords, the NMD 703*a* performs the corresponding command.

The event detector 771*a* can employ an automatic speech recognizer 772. The ASR 772 is configured to output phonetic or phonemic representations, such as text corresponding to words, based on sound in the sound-data stream $S_{DS}$ to text. For instance, the ASR 772 may transcribe spoken words represented in the sound-data stream $S_{DS}$ to one or more strings representing the voice input 780 as text. The event detector 771 may also comprise a local natural language unit (NLU) and keyword engine 776 which may be arranged to receive the ASR output (labeled as $S_{ASR}$) and identify particular keywords as being keyword events during the input detection window, as described below.

In some examples, the keyword engine 776 may comprise a library of keywords and corresponding commands, such as "play", "pause" and "skip". The keyword engine 776 receives the ASR output $S_{ASR}$ and analyzes the output $S_{ASR}$ to identify whether a known command is comprised within the output $S_{ASR}$, for example by performing a lookup within the list of keywords. If a known keyword is present within the output $S_{ASR}$, then the keyword engine 776 generates a keyword event and initiates a command corresponding to the keyword.

As noted above, in some example implementations, the NMD 703*a* is configured to perform natural language processing, which may be carried out using an onboard natural language processor, referred to herein as a natural language unit (NLU) 779. The local NLU 779 is configured to analyze text output of the ASR 772 of the event detector 771*a* to spot (i.e., detect or identify) keywords in the voice input 780. In FIG. 7A, this output is illustrated as the signal $S_{ASR}$.

In one aspect, the library of the local NLU 779 includes keywords. When the local NLU 779 identifies a keyword in the signal $S_{ASR}$, the event detector 771*a* generates a keyword event and performs a command corresponding to the keyword in the signal $S_{ASR}$, assuming that one or more conditions corresponding to that keyword are satisfied.

As with the keyword engine 776, the library of the local NLU 779 also include keywords corresponding to command, however, the library of the local NLU 779 may also comprise commands corresponding to parameters, enabling for more detailed inputs to be provided and more complex commands to be performed. The local NLU 779 may then determine an underlying intent from the matched keywords in the voice input 780. For instance, if the local NLU matches the keywords "David Bowie" and "kitchen" in combination with a play command, the local NLU 779 may determine an intent of playing David Bowie in the Kitchen 101*h* on the playback device 102*i*. In contrast to a processing of the voice input 780 by a cloud-based VAS, local processing of the voice input 780 by the local NLU 779 may be relatively less sophisticated, as the NLU 779 does not have access to the relatively greater processing capabilities and larger voice databases that a VAS generally has access to.

In some examples, the local NLU 779 may determine an intent with one or more slots, which correspond to respective keywords. For instance, referring back to the play David Bowie in the Kitchen example, when processing the voice input, the local NLU 779 may determine that an intent is to play music (e.g., intent=playMusic), while a first slot includes David Bowie as target content (e.g., slot1=DavidBowie) and a second slot includes the Kitchen 101*h* as the target playback device (e.g., slot2-kitchen). Here, the intent (to "playMusic") is based on the keyword and the slots are parameters modifying the intent to a particular target content and playback device.

Determining whether to utilize the NLU 779 alone, to utilize the NLU 779 in combination with the ASR 772, or to utilize the keyword engine 776 may be dependent on one or more properties of the device or current operating environment. For example, where the device is a battery powered device or is in a low-power mode, the device may default to using the keyword engine 776 which requires less power.

Within examples, the event detector 771*a* outputs a signal, $S_{CW}$, that indicates the occurrence of a keyword event to the local NLU 779. In response to the keyword event (e.g., in response to the signal $S_{CW}$ indicating the keyword event), the local NLU 779 is configured to receive and process the signal $S_{ASR}$. In particular, the local NLU 779 looks at the words within the signal $S_{ASR}$ to find keywords that match keywords in the library of the local NLU 779.

Using a keyword engine comprising a library of known keywords and associated commands, as described above, there is no requirement to process the output $S_{ASR}$ using the local NLU 779 as will be described below. This results in the performing of commands using fewer resources and results in a decrease in power which is especially beneficial for portable devices relying on batter power, since the use of the local NLU 779 can be power intensive in comparison to a keyword engine performing a lookup in a library of keywords. Therefore, as shown in FIG. 7*b*, the NMD 703*b* may comprise only the keyword engine 776.

Some error in performing local automatic speech recognition is expected. Within examples, the ASR 772 may generate a confidence score when transcribing spoken words to text, which indicates how closely the spoken words in the voice input 780 matches the sound patterns for that word. In some implementations, generating a keyword event is based on the confidence score for a given keyword. For instance, the event detector 771*a* may generate a keyword event when the confidence score for a given sound exceeds a given threshold value (e.g., 0.5 on a scale of 0-1, indicating that the given sound is more likely than not the keyword). Conversely, when the confidence score for a given sound is at or below the given threshold value, the event detector 771*a* does not generate the keyword event.

Similarly, some error in performing keyword matching is expected. Within examples, the local NLU may generate a confidence score when determining an intent, which indicates how closely the transcribed words in the signal $S_{ASR}$ match the corresponding keywords in the library of the local NLU. In some implementations, performing an operation according to a determined intent is based on the confidence score for keywords matched in the signal $S_{ASR}$. For instance, the NMD 703 may perform an operation according to a determined intent when the confidence score for a given sound exceeds a given threshold value (e.g., 0.5 on a scale of 0-1, indicating that the given sound is more likely than not the keyword). Conversely, when the confidence score for a given intent is at or below the given threshold value, the NMD 703 does not perform the operation according to the determined intent.

As noted above, in some implementations, a phrase may be used a keyword, which provides additional syllables to match (or not match). For instance, the phrase "play me some music" has more syllables than "play," which provides additional sound patterns to match to words. Accordingly, keywords that are phrases may generally be less prone to false wake words.

As indicated above, the NMD 703*a* generates a keyword event (and performs a command corresponding to the detected keyword) only when certain conditions corresponding to a detected keyword are met. These conditions are intended to lower the prevalence of false positive keyword events. For instance, after detecting the keyword "skip," the NMD 703*a* generates a keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the keyword event is not generated (and no skip is performed).

The NMD 703*a* includes the one or more state machine(s) 775*a* to facilitate determining whether the appropriate conditions are met. The state machine 775*a* transitions between a first state and a second state based on whether one or more conditions corresponding to the detected keyword are met. In particular, for a given keyword corresponding to a particular command requiring one or more particular conditions, the state machine 775*a* transitions into a first state when one or more particular conditions are satisfied and transitions into a second state when at least one condition of the one or more particular conditions is not satisfied.

Within example implementations, the command conditions are based on states indicated in state variables. As noted above, the devices of the MPS 100 may store state variables describing the state of the respective device. For instance, the playback devices 102 may store state variables indicating the state of the playback devices 102, such as the audio content currently playing (or paused), the volume levels, network connection status, and the like). These state variables are updated (e.g., periodically, or based on an event (i.e., when a state in a state variable changes)) and the state variables further can be shared among the devices of the MPS 100, including the NMD 703.

Similarly, the NMD 703 may maintain these state variables (either by virtue of being implemented in a playback device or as a stand-alone NMD). The state machine 775*a* monitors the states indicated in these state variables, and determines whether the states indicated in the appropriate state variables indicate that the command condition(s) are satisfied. Based on these determinations, the state machine 775*a* transitions between the first state and the second state, as described above.

In some implementations, the event detector 771*a* may be disabled unless certain conditions have been met via the state machines. For example, the first state and the second state of the state machine 775*a* may operate as enable/disable toggles to the event detector 771*a*. In particular, while a state machine 775*a* keyword is in the first state, the state machine 775*a* enables the event detector 771*a* thereby enabling the detection of events received in the media playback system within a given input detection window, such as interaction with a controller device. Conversely, while the state machine 775*a* in the second state, the state machine 775*a* disables the event detector 771*a* preventing the detection of events, and opening of an input detection window. Accordingly, the disabled event detector 771*a* ceases analyzing the sound-data stream $S_{DS}$. In such cases when at least one command condition is not satisfied, the NMD 703*a* may suppress generation of keyword event when the event detector 771*a* detects a keyword. Suppressing generation may involve gating, blocking or otherwise preventing output from the event detector 771*a* from generating the keyword event. Alternatively, suppressing generation may involve the NMD 703 ceasing to feed the sound-data stream $S_{DS}$ to the ASR 772. Such suppression prevents a command corresponding to the detected keyword from being performed when at least one command condition is not satisfied. In such embodiments, the event detector 771*a* may continue analyzing the sound-data stream $S_{DS}$ while the state machine 775*a* is in the first state, but keyword events are disabled.

Other example conditions may be based on the output of a voice activity detector ("VAD") 765. The VAD 765 is configured to detect the presence (or lack thereof) of voice activity in the sound-data stream $S_{DS}$. In particular, the VAD 765 may analyze frames corresponding to the pre-roll portion of the voice input 780 (FIG. 2D) with one or more voice detection algorithms to determine whether voice activity was present in the environment in certain time windows prior to a keyword portion of the voice input 780.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that don't include voice activity. The frames that the VAD determines have voice activity may be caused by speech regardless of whether it near- or far-field. In this example and others, the VAD 765 may determine a count of frames in the pre-roll portion of the voice input 780 that indicate voice activity. If this count exceeds a threshold percentage or number of frames, the VAD 765 may be configured to output a signal or set a state variable indicating that voice activity is present in the environment. Other metrics may be used as well in addition to, or as an alternative to, such a count.

The presence of voice activity in an environment may indicate that a voice input is being directed to the NMD 73. Accordingly, when the VAD 765 indicates that voice activity is not present in the environment (perhaps as indicated by a state variable set by the VAD 765) this may be configured as one of the command conditions for the keywords. When this condition is met (i.e., the VAD 765 indicates that voice activity is present in the environment), the state machine 775*a* will transition to the first state to enable performing commands based on keywords, so long as any other conditions for a particular keyword are satisfied. Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification, may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification.

In various embodiments, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

Referring back to FIG. 7A, in some implementations, the additional buffer 769 (shown in dashed lines) may store information (e.g., metadata or the like) regarding the detected sound $S_D$ that was processed by the upstream AEC 763 and spatial processor 764. This additional buffer 769 may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound $S_D$.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input 780 indicates that the voice input 780 might not be directed to the NMD 703, but instead be conversational speech within the environment. For instance, a household member might speak something like "our kids should have a play date soon" without intending to direct the keyword "play" to the NMD 703.

Further, when the noise classifier indicates that background speech is present is present in the environment, this condition may disable the window detector 771*a*. In some implementations, the condition of background speech being absent in the environment (perhaps as indicated by a state variable set by the noise classifier 766) is configured as one of the command conditions for the keywords. Accordingly, the state machine 775*a* will not transition to the first state when the noise classifier 766 indicates that background speech is present in the environment.

Further, the noise classifier 766 may determine whether background speech is present in the environment based on one or more metrics. For example, the noise classifier 766 may determine a count of frames in the pre-roll portion of the voice input 780 that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Within example implementations, the NMD 703*a* may support a plurality of keywords. To facilitate such support, the event detector 771*a* may implement multiple identification algorithms corresponding to respective keywords. Alternatively, the NMD 703*a* may implement additional event detectors 771*b* configured to identify respective keywords. Yet further, the library of the local NLU 779 may include a plurality of keywords and be configured to search for text patterns corresponding to these keywords in the signal $S_{ASR}$.

Further, keywords may require different conditions. For instance, the conditions for "skip" may be different than the conditions for "play" as "skip" may require that the condition that a media item is being played back and play may require the opposite condition that a media item is not being played back. To facilitate these respective conditions, the NMD 703*a* may implement respective state machines 775*a* corresponding to each keyword. Alternatively, the NMD 703*a* may implement a state machine 775*a* having respective states for each keyword. Other examples are possible as well.

In some example implementations, the VAS wake-word engine 770*a* generates a VAS wake-word event when certain conditions are met. The NMD 703*b* includes a state machine 775*b*, which is similar to the state machine 775*a*. The state machine 775*b* transitions between a first state and a second state based on whether one or more conditions corresponding to the VAS wake word are met.

For instance, in some examples, the VAS wake-word engine 770*a* may generate a VAS wake word event only when background speech was not present in the environment before a VAS wake-word event was detected. An indication of whether voice activity is present in the environment may come from the noise classifier 766. As noted above, the noise classifier 766 may be configured to output a signal or set a state variable indicating that far-field speech is present in the environment. Yet further, the VAS wake-word engine 770*a* may generate a VAS wake word event only when voice activity is present in the environment. As indicated above, the VAD 765 may be configured to output a signal or set a state variable indicating that voice activity is present in the environment.

To illustrate, as shown in FIG. 7B, the VAS wake-word engine 770*a* is connected to the state machines 775*b*. The state machine 775*b* may remain in a first state when one or more conditions are met, which may include a condition of voice activity not being present in the environment. When the state machine 775*b* is in the first state, the VAS wake-word engine 770*a* is enabled and will generate VAS wake-word events. If any of the one or more conditions are not met, the state machine 775*b* transitions to a second state, which disables the VAS wake-word engine 770*a*.

Yet further, the NMD 703 may include one or more sensors that output a signal indicating whether one or more users are in proximity to the NMD 703. Example sensors include a temperature sensor, an infrared sensor, an imaging sensor, and/or a capacitive sensor, among other examples. The NMD 703 may use output from such sensors to set one or more state variables indicating whether one or more users are in proximity to the NMD 703. Then, the state machine 775*b* may use the presence or lack thereof as a condition for the state machine 775*b*. For instance, the state machine 775*b* may enable the VAS wake-word engine and/or the event detector 771*a* when at least one user is in proximity to the NMD 703.

Figure 7C:
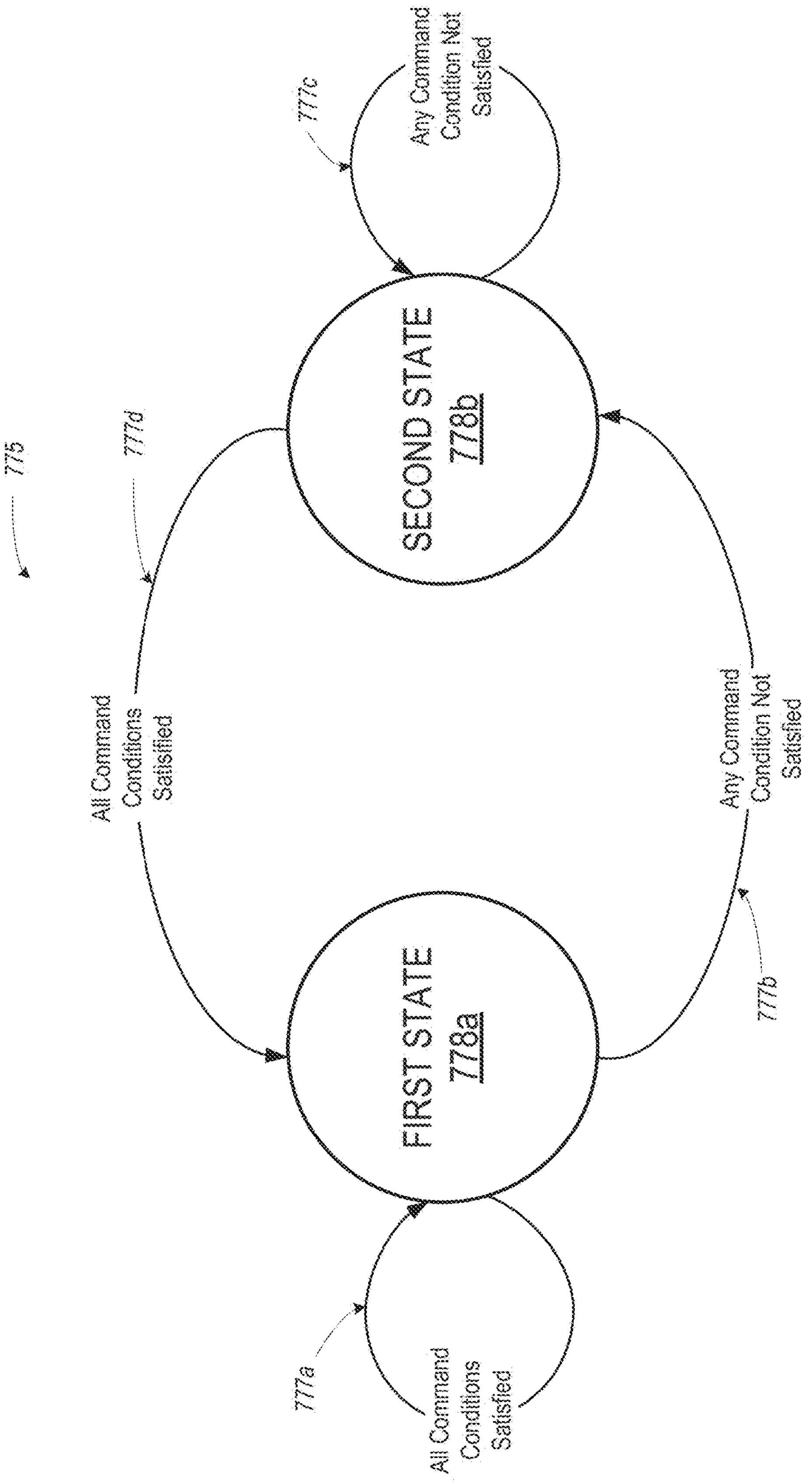
FIG. 7C is a functional block diagram illustrating an example state machine in accordance with aspects of the disclosure.

To illustrate exemplary state machine operation, FIG. 7C is a block diagram illustrating the state machine 775 for an example keyword requiring one or more command conditions. At 777*a*, the state machine 775 remains in the first state 778*a* while all the command conditions are satisfied. While the state machine 775 remains in the first state 778*a* (and all command conditions are met), the NMD 703*a* will generate a keyword event when the keyword is detected by the event detector 771*a*.

At 777*b*, the state machine 775 transitions into the second state 778*b* when any command condition is not satisfied. At 777*c*, the state machine 775 remains in the second state 778*b* while any command condition is not satisfied. While the state machine 775 remains in the second state 778*b*, the NMD 703*a* will not act on the keyword event when the keyword is detected by the event detector 771*a*.

Referring back to FIG. 7A, in some examples, the one or more additional event detectors 771*b* may include custom event detectors. Cloud service providers, such as streaming audio services, may provide a custom keyword engine pre-configured with identification algorithms configured to spot service-specific keywords. These service-specific keywords may include commands for custom service features and/or custom names used in accessing the service.

For instance, the NMD 703*a* may include a particular streaming audio service (e.g., Apple Music) event detector 771*b*. This particular event detector 771*b* may be configured to detect keywords specific to the particular streaming audio service and generate streaming audio service wake word events. For instance, one keyword may be "Friends Mix," which corresponds to a command to play back a custom playlists generated from playback histories of one or more "friends" within the particular streaming audio service.

A custom event detector 771*b* may be relatively more prone to false wake words than the VAS wake-word engine 770*a*, as generally the VAS wake-word engine 770*a* is more sophisticated than a custom event detector 771*b*. To mitigate this, custom keywords may require one or more conditions to be satisfied before generating a custom keyword event. Further, in some implementations, in an effort to reduce the prevalence of false positives, multiple conditions may be imposed as a requirement to include a custom event detector 771*b* in the NMD 703*a*.

These custom keyword conditions may include service-specific conditions. For instance, keywords corresponding to premium features or playlists may require a subscription as a condition. As another example, custom keywords corresponding to a particular streaming audio service may require media items from that streaming audio service in the playback queue. Other conditions are possible as well.

To gate custom event detectors based on the custom keyword conditions, the NMD 703*a* may comprise additional state machines 775*a* corresponding to each custom keyword. Alternatively, the NMD 703*a* may implement a state machine 775*a* having respective states for each custom keyword. Other examples are possible as well. These custom command conditions may depend on the state variables maintained by the devices within the MPS 100, and may also depend on state variables or other data structures representing a state of a user account of a cloud service, such as a streaming audio service.

A plurality of different keywords may be supported by the keyword engine 776 of the event detector 771*a* in the NMD. Furthermore, each keyword may have a plurality of cognates having similar intent for use when analyzed by the NLU 779, such as:

- 'play'—'turn on', 'resume'—be used to initiate the playback of a media item, possibly in a playback queue;
- 'pause'—'stop', 'quiet', 'mute', 'off'—used to cease sound emission by a playback device, for example by stopping playback of a currently playing media item;
- 'next'—'skip', 'forward', "skip forward"—used to go to a next media item in a playback queue;
- 'previous'—'back', 'last', "skip back"—used to go to a previous media item in a playback queue;
- 'repeat'—'restart', 'again'—used to restart a currently playing media item;
- 'shuffle'—'randomize'—used to play media items in a playback queue in a random order;
- 'volume up'—'increase', 'turn up', 'louder'—used to increase a playback volume; and
- 'volume down'—'decrease', 'turn down', 'quieter'—used to decrease a playback volume.

A device state machine may also be used to monitor the overall state of the NMD 703*a*. The keyword engine 776 and NLU 779 may be disabled until the device state machine indicates an event has occurred or is predicted to occur and then be enabled only for a given time period. The device state machine may be used to generate event notifications on the transition between the first state and second state, which in turn are detected by the event detector 771*a* thereby enabling the keyword engine 776 and/or NLU 779 for a given period of time. The device state machine can be used to indicate when a current track is coming to an end such that the device is playing a current track in a first state and upon the start of a next track the state machine transitions to a second state. The individual states of the state machine may be monitored to determine when an event is likely. For example, the playback progress of a given media item can be tracked such that it is determined when the media item is approaching the end, the monitor may then raise a notification indicating that an event is predicted or imminent.

In some implementations, each of the keywords are associated with one or more conditions based on the device state machine. For example, where there are no more media items in the playback queue, even if the keyword 'next' was processed the command event would not be issued since the device is unable to play a next media item. Similarly, if the device volume was at a maximum volume, then an event associated with the 'volume up' command would not be issued since the device is unable to increase the volume further.

Referring back to FIG. 7A, in example embodiments, the VAS wake-word engine 770*a* and the event detector 771*a* may take a variety of forms. For example, the VAS wake-word engine 770*a* and the event detector 771*a* may take the form of one or more modules that are stored in memory of the NMD 703*a* and/or the NMD 703*b* (e.g., the memory 112*b* of FIG. 1F). As another example, the VAS wake-word engine 770*a* and the event detector 771*a* may take the form of a general-purposes or special-purpose processor, or modules thereof. In this respect, multiple wake-word engines 770 and 771 may be part of the same component of the NMD 703*a* or each wake-word engine 770 and 771 may take the form of a component that is dedicated for the particular wake-word engine. Other possibilities also exist.

To further reduce false positives, the event detector 771*a* may utilize a lower sensitivity compared with the VAS wake-word engine 770*a*. In practice, a wake-word engine may include a sensitivity level setting that is modifiable. The sensitivity level may define a degree of similarity between a word identified in the detected sound stream $S_{DS1}$ and the wake-word engine's one or more particular wake words that is considered to be a match (i.e., that triggers a VAS wake-word or keyword event). In other words, the sensitivity level defines how closely, as one example, the spectral characteristics in the detected sound stream $S_{DS2}$ must match the spectral characteristics of the engine's one or more wake words to be a wake-word trigger.

In this respect, the sensitivity level generally controls how many false positives that the VAS wake-word engine 770*a* and event detector 771*a* identifies. For example, if the VAS wake-word engine 770*a* is configured to identify the wake-word "Alexa" with a relatively high sensitivity, then false wake words of "Election" or "Lexus" may cause the wake-word engine 770*a* to flag the presence of the wake-word "Alexa." In contrast, if the event detector 771*a* is configured with a relatively low sensitivity, then the false wake words of "may" or "day" would not cause the event detector 771*a* to flag the presence of the keyword "Play."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Within examples, a sensitivity level of the window detector 771*a* may be based on more or more confidence scores, such as the confidence score in spotting a and/or a confidence score in determining an intent. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 703 a wake-word engine update that modifies one or more sensitivity level parameters for the given VAS wake-word engine 770*a*. By contrast, the sensitive level parameters of the event detector 771*a* may be configured by the manufacturer of the NMD 703*a* or by another cloud service (e.g., for a custom wake-word engine 771*b*).

Notably, within certain examples, the NMD 703*a* does not send any data representing the detected sound $S_D$ (e.g., the messages $M_V$) to a VAS when processing a voice input 780 including a. In implementations including the local NLU 779, the NMD 703*a* can further process the voice utterance portion of the voice input 780 (in addition to the keyword word portion) without necessarily sending the voice utterance portion of the voice input 780 to the VAS. Accordingly, speaking a voice input 780 (with a) to the NMD 703 may provide increased privacy relative to other NMDs that process all voice inputs using a VAS. Furthermore, like keyword detection, in some examples wake-word detection may only be active during an input detection window and inactive otherwise. This prevents the unintentional activation of the VAS during normal conversation because of the detection of voice inputs which are similar to the VAS wake word, which can increase privacy.

As indicated above, the keywords in the library of the local NLU 779 correspond to parameters. These parameters may define to perform the command corresponding to the detected keyword. When keywords are recognized in the voice input 780, the command corresponding to the detected keyword is performed according to parameters corresponding to the detected keywords.

For instance, an example voice input 780 may be "play music at low volume" with "play" being the keyword portion (corresponding to a playback command) and "music at low volume" being the voice utterance portion. When analyzing this voice input 780, the NLU 779 may recognize that "low volume" is a keyword in its library corresponding to a parameter representing a certain (low) volume level. Accordingly, the NLU 779 may determine an intent to play at this lower volume level. Then, when performing the playback command corresponding to "play," this command is performed according to the parameter representing a certain volume level.

In a second example, another example voice input 780 may be "play my favorites in the Kitchen" with "play" again being the keyword portion (corresponding to a playback command) and "my favorites in the Kitchen" as the voice utterance portion. When analyzing this voice input 780, the NLU 779 may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen 101*h* zone. Accordingly, the NLU 779 may determine an intent to play this particular playlist in the kitchen 101*h* zone.

In a third example, a further example voice input 780 may be "volume up" with "volume" being the keyword portion (corresponding to a volume adjustment command) and "up" being the voice utterance portion. When analyzing this voice input 780, the NLU 779 may recognize that "up" is a keyword in its library corresponding to a parameter representing a certain volume increase (e.g., a 10 point increase on a 100 point volume scale). Accordingly, the NLU 779 may determine an intent to increase volume. Then, when performing the volume adjustment command corresponding to "volume," this command is performed according to the parameter representing the certain volume increase.

Within examples, certain keywords are functionally linked to a subset of the keywords within the library of the local NLU 779, which may hasten analysis. For instance, the keyword "skip" may be functionality linked to the keywords "forward" and "backward" and their cognates. Accordingly, when the keyword "skip" is detected in a given voice input 780, analyzing the voice utterance portion of that voice input 780 with the local NLU 779 may involve determining whether the voice input 780 includes any keywords that match these functionally linked keywords (rather than determining whether the voice input 780 includes any keywords that match any keyword in the library of the local NLU 779). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the keyword alone does not provide enough information to perform the corresponding command. For example, the keyword "volume" might require a parameter to specify a volume increase or decrease, as the intent of "volume" of volume alone is unclear. As another example, the keyword "group" may require two or more parameters identifying the target devices to group.

Accordingly, in some example implementations, when a given keyword is detected in the voice input 780 by the event detector 771*a*, the local NLU 779 may determine whether the voice input 780 includes keywords matching keywords in the library corresponding to the required parameters. If the voice input 780 does include keywords matching the required parameters, the NMD 703*a* proceeds to perform the command (corresponding to the given keyword) according to the parameters specified by the keywords.

However, if the voice input 780 does include keywords matching the required parameters for the command, the NMD 703*a* may prompt the user to provide the parameters. For instance, in a first example, the NMD 703*a* may play an audible prompt such as "I've heard a command, but I need more information" or "Can I help you with something?" Alternatively, the NMD 703*a* may send a prompt to a user's personal device via a control application (e.g., the software components 132*c* of the control device(s) 104).

In further examples, the NMD 703*a* may play an audible prompt customized to the detected keyword. For instance, after detect a keyword corresponding to a volume adjustment command (e.g., "volume"), the audible prompt may include a more specific request such as "Do you want to adjust the volume up or down?" As another example, for a grouping command corresponding to the keyword "group," the audible prompt may be "Which devices do you want to group?" Supporting such specific audible prompts may be made practicable by supporting a relatively limited number of keywords (e.g., less than 100), but other implementations may support more keywords with the trade-off of requiring additional memory and processing capability.

Within additional examples, when a voice utterance portion does not include keywords corresponding to one or more required parameters, the NMD 703*a* may perform the corresponding command according to one or more default parameters. For instance, if a playback command does not include keywords indicating target playback devices 102 for playback, the NMD 703*a* may default to playback on the NMD 703*a* itself (e.g., if the NMD 703*a* is implemented within a playback device 102) or to playback on one or more associated playback devices 102 (e.g., playback devices 102 in the same room or zone as the NMD 703*a*). Further, in some examples, the user may configure default parameters using a graphical user interface (e.g., user interface 430) or voice user interface. For example, if a grouping command does not specify the playback devices 102 to group, the NMD 703*a* may default to instructing two or more pre-configured default playback devices 102 to form a synchrony group. Default parameters may be stored in data storage (e.g., the memory 112*b* (FIG. 1F)) and accessed when the NMD 703*a* determines that keywords exclude certain parameters. Other examples are possible as well.

In some cases, the NMD 703*a* sends the voice input 780 to a VAS when the local NLU 779 is unable to process the voice input 780 (e.g., when the local NLU is unable to find matches to keywords in the library, or when the local NLU 779 has a low confidence score as to intent). In an example, to trigger sending the voice input 780, the NMD 703*a* may generate a bridging event, which causes the voice extractor 773 to process the sound-data stream $S_D$, as discussed above. That is, the NMD 703*a* generates a bridging event to trigger the voice extractor 773 without a VAS wake-word being detected by the VAS wake-word engine 770*a* (instead based on a keyword in the voice input 780, as well as the NLU 779 being unable to process the voice input 780).

Before sending the voice input 780 to the VAS (e.g., via the messages $M_V$), the NMD 703*a* may obtain confirmation from the user that the user acquiesces to the voice input 780 being sent to the VAS. For instance, the NMD 703*a* may play an audible prompt to send the voice input to a default or otherwise configured VAS, such as "I'm sorry, I didn't understand that. May I ask Alexa?" In another example, the NMD 703*a* may play an audible prompt using a VAS voice (i.e., a voice that is known to most users as being associated with a particular VAS), such as "Can I help you with something?" In such examples, generation of the bridging event (and trigging of the voice extractor 773) is contingent on a second affirmative voice input 780 from the user.

Within certain example implementations, the local NLU 779 may process the signal $S_{ASR}$ without necessarily a keyword event being generated by the event detector 771*a* (i.e., directly). That is, the automatic speech recognition 772 may be configured to perform automatic speech recognition on the sound-data stream $S_D$, which the local NLU 779 processes for matching keywords without requiring a keyword event. If keywords in the voice input 780 are found to match keywords corresponding to a command (possibly with one or more keywords corresponding to one or more parameters), the NMD 703*a* performs the command according to the one or more parameters.

Further, in such examples, the local NLU 779 may process the signal $S_{ASR}$ directly only when certain conditions are met. In particular, in some embodiments, the local NLU 779 processes the signal $S_{ASR}$ only when the state machine 775*a* is in the first state. The certain conditions may include a condition corresponding to no background speech in the environment. An indication of whether background speech is present in the environment may come from the noise classifier 766. As noted above, the noise classifier 766 may be configured to output a signal or set a state variable indicating that far-field speech is present in the environment. Further, another condition may correspond to voice activity in the environment. The VAD 765 may be configured to output a signal or set a state variable indicating that voice activity is present in the environment. Similarly, the prevalence of false positive detection of commands with a direct processing approach may be mitigated using the conditions determined by the state machine 775*a*.

In some examples, the library of the local NLU 779 is partially customized to the individual user(s). In a first aspect, the library may be customized to the devices that are within the household of the NMD (e.g., the household within the environment 101 (FIG. 1A)). For instance, the library of the local NLU may include keywords corresponding to the names of the devices within the household, such as the zone names of the playback devices 102 in the MPS 100. In a second aspect, the library may be customized to the users of the devices within the household. For example, the library of the local NLU 779 may include keywords corresponding to names or other identifiers of a user's preferred playlists, artists, albums, and the like. Then, the user may refer to these names or identifiers when directing voice inputs to the event detector 771*a* and the local NLU 779.

Within example implementations, the NMD 703*a* may populate the library of the local NLU 779 locally within the network 111 (FIG. 1B). As noted above, the NMD 703*a* may maintain or have access to state variables indicating the respective states of devices connected to the network 111 (e.g., the playback devices 104). These state variables may include names of the various devices. For instance, the kitchen 101*h* may include the playback device 101*b*, which are assigned the zone name "Kitchen." The NMD 703*a* may read these names from the state variables and include them in the library of the local NLU 779 by training the local NLU 779 to recognize them as keywords. The keyword entry for a given name may then be associated with the corresponding device in an associated parameter (e.g., by an identifier of the device, such as a MAC address or IP address). The NMD 703*a* can then use the parameters to customize control commands and direct the commands to a particular device.

In further examples, the NMD 703*a* may populate the library by discovering devices connected to the network 111. For instance, the NMD 703*a* may transmit discovery requests via the network 111 according to a protocol configured for device discovery, such as universal plug- and play (UPnP) or zero-configuration networking. Devices on the network 111 may then respond to the discovery requests and exchange data representing the device names, identifiers, addresses and the like to facilitate communication and control via the network 111. The NMD 703*a* may read these names from the exchanged messages and include them in the library of the local NLU 779 by training the local NLU 779 to recognize them as keywords.

IV. Example Input Detection Window Techniques

Figure 8:
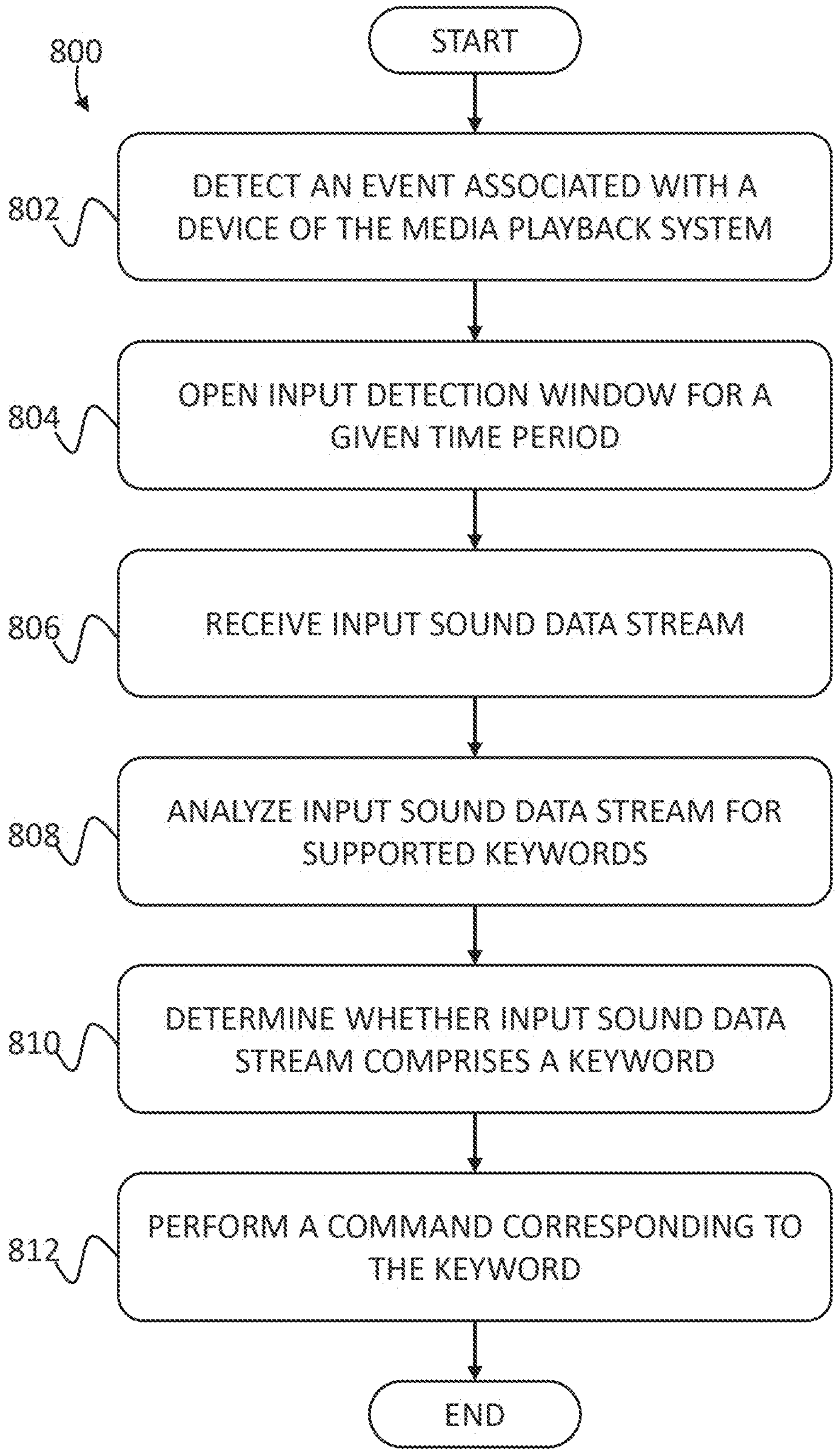
FIG. 8 is a flow diagram of an example method to perform an operation based on a voice input data stream received within an input detection window.

FIG. 8 is a flow diagram showing an example method 800 to perform a command based on a keyword event which is received during an input detection window initiated by the detection of an event associated with a device or a system comprising the device. The method 800 may be performed by a device, such as the NMD 103*a* of FIG. 1A, or a playback device such as playback device 102 of FIG. 2A. The device may include features of the NMD 103*a* of FIG. 7A.

At block 802, the method 800 involves detecting an event associated with the device or a system comprising the device. The event may be an actual event or a predicted event and may be based on a device state machine. For example, an event indicating that a new media item is to be played may be determined as a media item approaches the end of its content, for example within 20 seconds, 10 seconds, or 5 seconds from the end of the media item. Events may be associated with an output of a particular NMD, playback device or a controller device. Other examples of events include user interaction with a controller application on the controller device, interaction with a user interface element of the NMD or playback device, or the detection of an environmental change, such as the presence of a user or repositioning of the NMD.

At block 804, an input detection window is opened for a given time period. The input detection window enables an input sound data stream to be received by the NMD 703*a*. The input detection window is opened for a given time period and starts at a predetermined time relative to a time of the determined event. For example, the input detection window may be opened 5 seconds before the end of a media item, the end of the media item being the determined event. Further examples are described below with reference to FIGS. 9A-9D.

The given time period may be based on an analysis of historical data stored in data storage of the NMD 703*a*. The historical data may include previous events and any associated commands associated with those events, such as commands received by the system within a predetermined from the event. In some examples, a frequency of use of the playback command and the amount of time between the issuance of the playback command and a determined event can be considered when determining the length of the given time period. By analyzing the historical data, the time period can be customized based on previous interactions with the NMD 703*a*. Furthermore, it will be appreciated that the length of the time period can be adjusted based on preferences set by a user, and individual users may have their own customized time periods associated with a user account of the media playback system.

At block 806, the method 800 involves receiving an input sound data stream detected by at least one microphone associated with the NMD 703*a* during the input detection window. The input sound data stream may comprise a number of different commands and/or background noise as described above in connection with FIG. 7A. By receiving the input sound data stream during the input detection window, it enables resource-intensive components of the NMD 703*a* to be activated only during the input detection window thereby increasing the efficiency of the system. It also prevents input sound data from being continuously processed, potentially increasing privacy and reducing false positives.

Next, at block 808, the method involves analyzing the input sound data stream to determine whether it comprises (i) a wake-word and/or (ii) a keyword. For example, the VAS wake word engine 770*a* of the NMD 703*a* may apply one or more wake word identification algorithms to the input sound data stream. Similarly, a keyword engine 776 and/or NLU 779 of the window detector 771*a* may monitor the input sound data stream for keywords, perhaps using the ASR 772, as described above in connection with FIG. 7A. The keyword engine 776 may use the ASR 772 with a library of predetermined keywords and use pattern matching to undertake the analysis, whereas the NLU 779 may use the ASR 772 along with one or more neural networks to determine an intent of the input sound data stream.

The input sound data stream will be analyzed by the ASR 772 of the window detector 771*a* when the input window is open, and the analysis of the input sound data stream may have an associated confidence value. When it is determined that the ASR 772 has a low confidence value in its analysis of the input sound data stream the NMD 703*a* may transmit a portion of the input sound data stream to a remote server, such as a server of a VAS. A low confidence value means that the output of the ASR 772 maps to a keyword with low confidence, and as such may be indicative that the input sound data stream contains keywords which are not contained in a local library of the NMD 703*a* . . . . Where the input sound data stream contains keywords, which are supported by the NMD 703*a*, at block 810 it is determined whether the input sound data stream comprises a playback keyword or other keywords, such as those previously listed.

At block 812, a command corresponding to the keyword is performed by the NMD 703*a*. For example, a keyword 'next' may be detected in the input detection window, based on the analysis, a corresponding command is generated and performed by the NMD 703*a* causing the next media item in the media playback queue to be played by the media playback system.

FIGS. 9A-9D are graphs 900, 910, 920, 930 of historical data indicating the receipt of commands either from a controller or via a voice input. The analysis of the historical data, as described above, may be used to determine the time period in which the input detection window is opened.

Figure 9A:
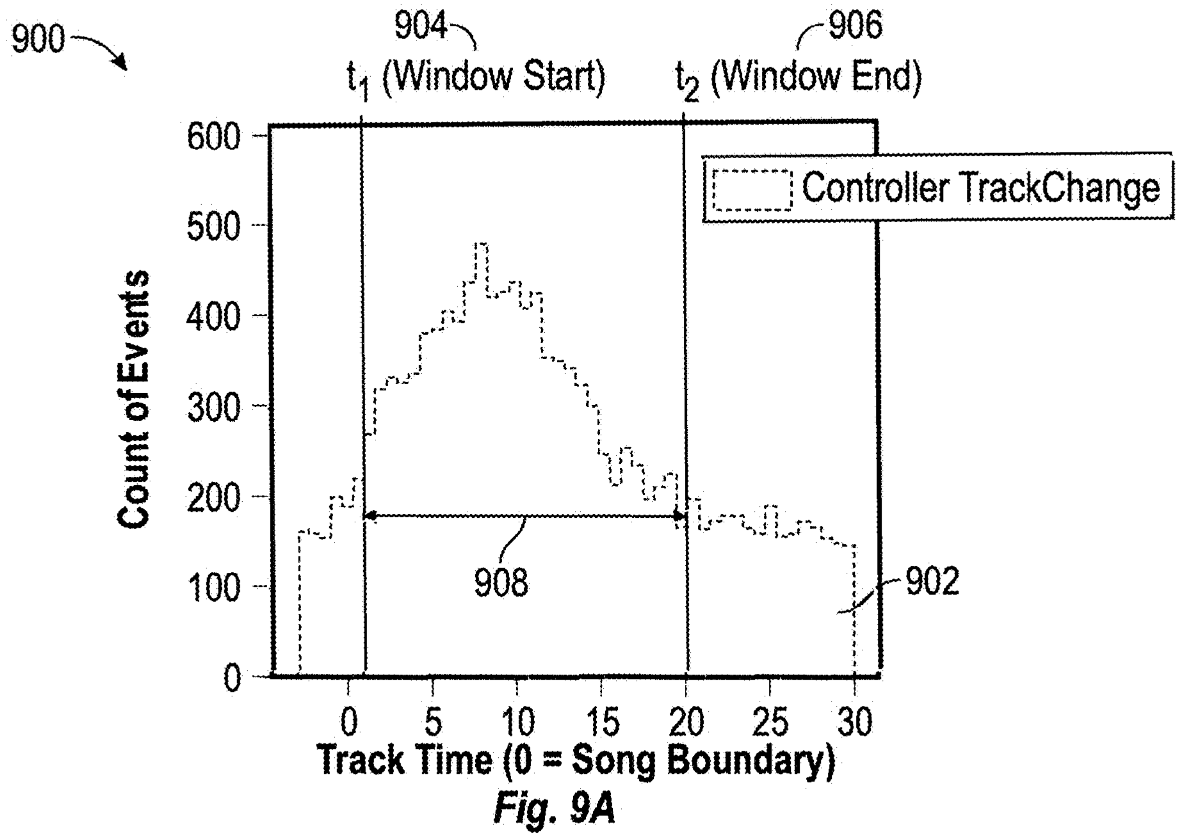
FIGS. 9A, 9B, 9C and 9D are graphs showing an exemplary analysis for determining an input detection window.

FIG. 9A shows a graph 900 of the frequency of track change commands received from a controller device associated with the media playback system. Track change commands are those that cause a media playback device to playback a different item than one currently playing. This includes commands to navigate a playlist, such as "skip" and commands to edit a playlist, such as adding a track to "play next" using a user interface of the controller device. The graph 900 shows the number of controller change track commands received along the y-axis relative to the time of a track along the x-axis, such that the frequency of change track commands over time 902 is represented by the dotted line. A time of 0 on the x-axis is a media item boundary, for example where a media item ends, the time along x-axis therefore indicates a frequency of change track commands from Based on an analysis of the frequency over time 902 the optimal length of time for the input detection window to be opened can be determined, as well as the optimal start time at which to open the window.

Graph 900 is derived from real usage data and shows that there is a significant peak of controller change track commands received around the 10-second mark. It demonstrates that track change commands are more likely to be received close to a media item boundary in a playlist. As such, it is desirable for the input detection window to be opened or start around at that time. Events are also received before and after this peak, therefore it is also desirable to enable user interaction at times other than a time corresponding to the peak frequency. Accordingly, the analysis of the historical data can be used to indicate that a start 904 of the window and an end 906 of the window, or in some examples a time period 908 from the start 904 of the window. In this example, the time period 908 is 18 seconds, the start 904 of the window is 2 seconds after a media item boundary and the end 906 of the window is 20 seconds after a media item boundary The historical data may be associated with a given user of the media playback system identified by a user account or login credentials. Consequently, the start of the window 904, the end of the window 906 or the time period 908 may be dependent on the given user's previous interaction with the media playback system, or another media playback system. In some examples, properties of the current playlist may be used to determine the length of the input detection window. When a media playback system is currently playing the last or final media item of a playlist, the input detection window activated at the end of the media item may be modified, such as by extending the length of the window. This provides the user with a longer time period to issue a command and realize that there are no further tracks in the playlist for the media playback system to playback.

Figure 9B:
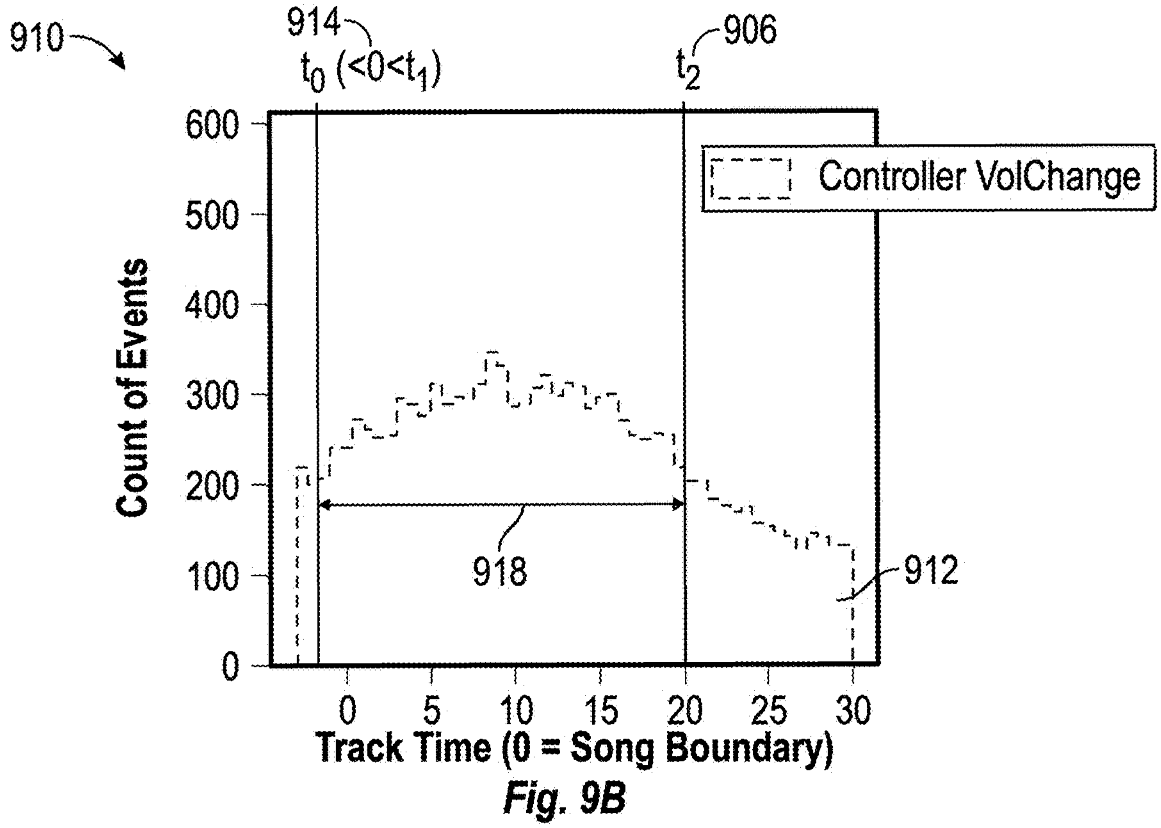

FIG. 9B shows a graph 910 of volume change commands received from a controller device associated with the media playback system. The graph 910 shows the number of volume change commands received along the y-axis relative to the time of a track along the x-axis, such that the frequency of volume change commands over time 912 is represented by the dotted line. As with FIG. 9A, time=0 is a media item boundary corresponding to an event to play a different media item. Based on an analysis of the frequency over time 912, a length of time for the input detection window to be opened can be determined, as well as a start time at which to open the window.

Graph 910 is created from real usage data and shows there is a peak of controller change volume comments received around the 10-second mark; this may correspond to changes in mastering volume between tracks. The distribution of the commands is across a longer period of time than the track change commands in FIG. 9A and there is a higher frequency of commands ahead of the event (media item boundary) at time=0. Accordingly, the analysis of the controller change volume commands results in a start 914 of the input detection window being moved to before the event at time=0, as indicated by the position of the start 914 of the window before zero on the x-axis. The end 906 of the window remains the same because the frequency of the change volume commands received from the controller is minimal past the end of the window 906 already determined in accordance with Graph 900 of FIG. 9A. As a result, a time period 918 for keeping the input detection window open is extended.

Figure 9C:
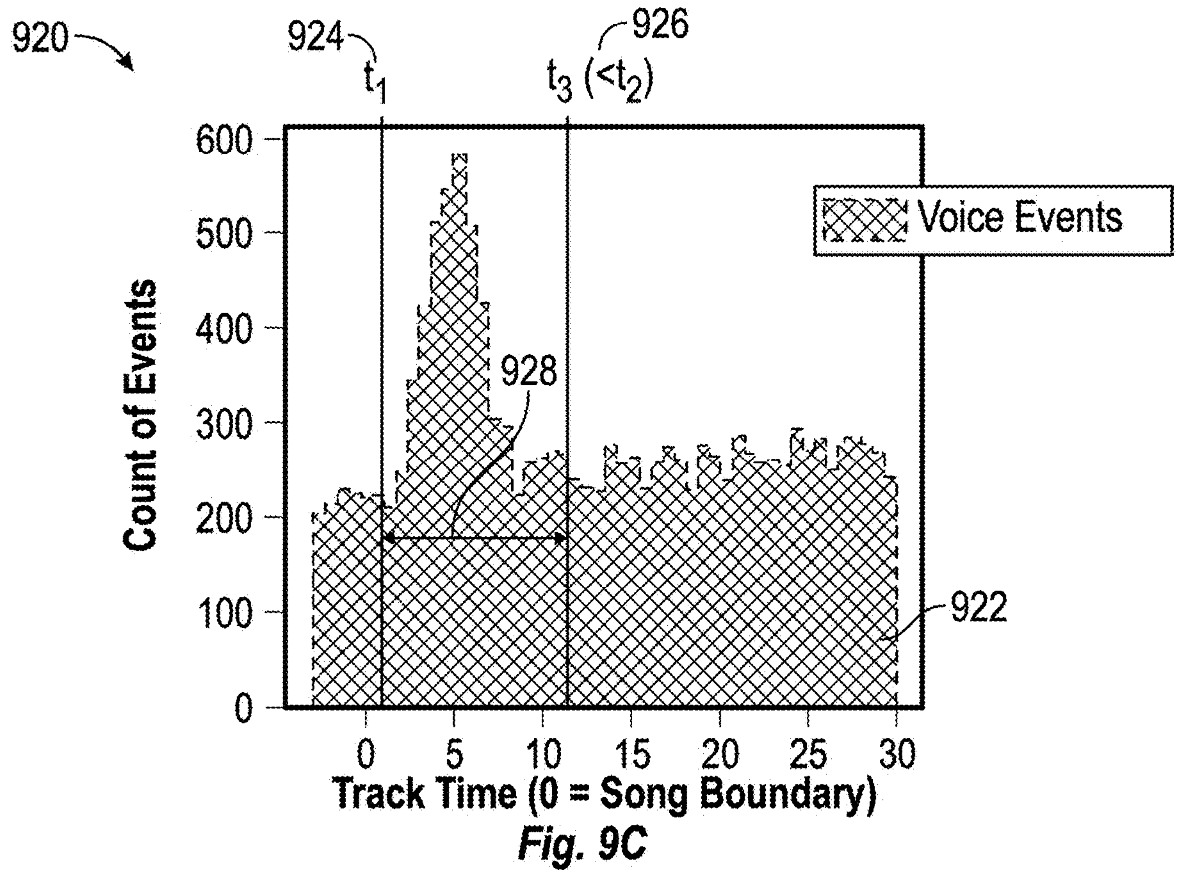

FIG. 9C shows a graph 920 of voice events detected by a device, such as an NMD 703*a*, associated with a media playback system. A voice event here is any utterance including at least one of a detected wake-word or command as discussed above with reference to FIG. 2C. The graph 920 shows the number of voice events received along the y-axis relative to the time of a track along the x-axis, with time-0 indicating a media item boundary as for FIGS. 9A and 9B, such that the frequency of voice events over time 922 is represented by the hatched area. Based on an analysis of the frequency over time 922, a length of time for the input detection window to be opened can be determined, as well as a start time at which to open the window.

Graph 920 is created from real usage data and shows there is a large peak of voice events received around the 5-second mark, and the distribution of the events is across a shorter period than the track change commands of FIG. 9A and the volume commands of FIG. 9B. It suggests that voice events occur much closer to an event, perhaps because a voice command can simply be spoken without first having to navigate to the correct part of a user interface of a controller. Therefore, the analysis of the voice events results in a start 924 of the input detection window being positioned just after an event (media item boundary), at around time=1 second and an end 926 of the input detection window being positioned at around time=11 seconds. As such, a time period 928 for keeping the input detection window open is relatively short at around 10 seconds, when compared to the analysis undertaken for controller track change commands and controller volume change commands discussed above with reference to FIGS. 9A and 9B.

Figure 9D:
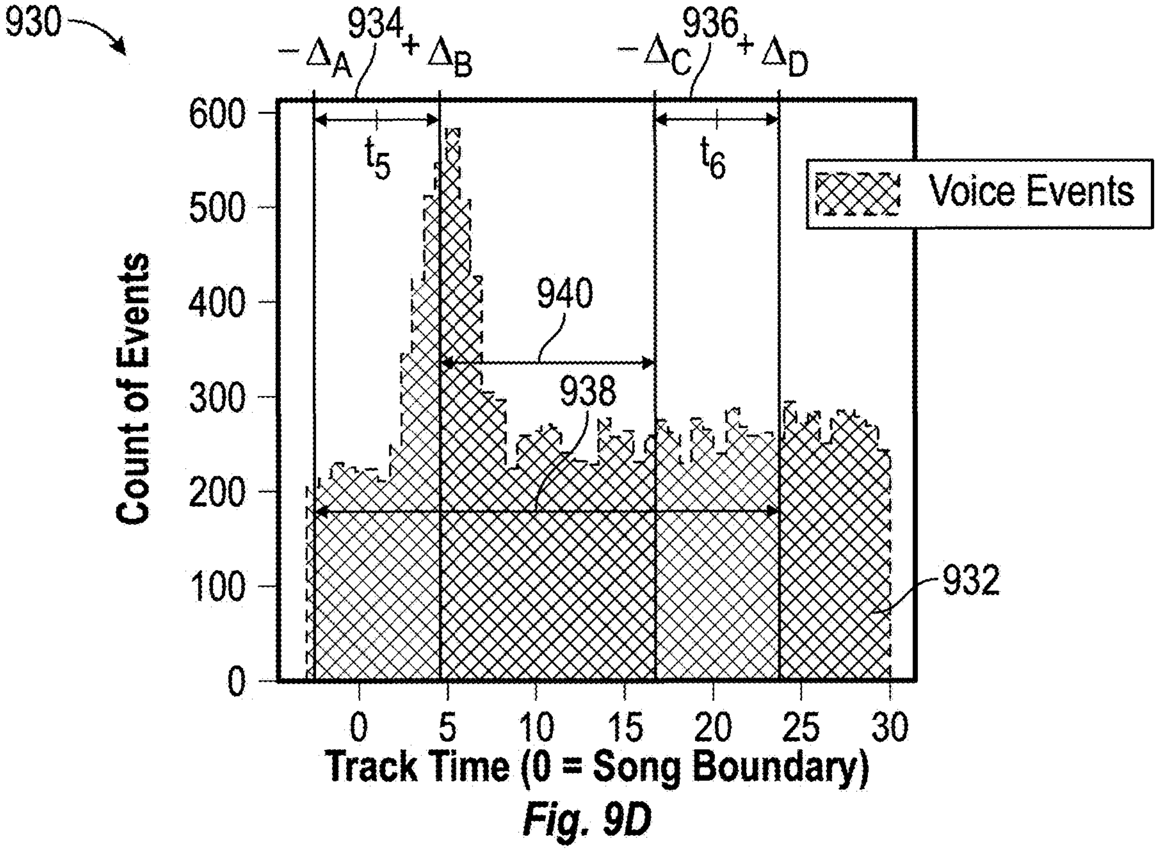

FIG. 9D shows a graph 930 of voice events received by a device, such as an NMD 703*a*, associated with a media playback system. It depicts the same data of a frequency of voice events over time as FIG. 9C and shows how an input window can be adjusted in start time, end time and duration. As shown schematically in FIG. 9D a predetermined start time $t_s$ and a predetermined end time, $t_E$, are predetermined, for example set by a manufacturer of a device. $t_s$ and $t_E$ can be determined based on test data from a number of users, for example. This can allow the voice input detection window to be used immediately, when no actual usage data has been collected from the media playback system itself. In use, as data indicating how the particular media playback system is used is collected, the start time and end time may be adjusted between the limits AA and AB within a period 934 for the start time, and between the limits AC and AD within a period 936 for the end time. As a result, the voice input window may vary between around 12 seconds in length (depicted by input window 940) to around 25 seconds in length (depicted by input window 938).

Based on the range of the start and the end of the input detection window, a user may specify a minimum and/or maximum time they wish the input detection window to be open for, this can be used to override the analyses undertaken, or may be used in combination with the analyses to further customize the length of time, as well as the start of the input detection window.

FIGS. 9A to 9D show how a voice input window which is open for a limited time based on an event can potentially improve privacy, reduce false positives and/or reduce resource usage. It can be seen that commands and voice events occur with higher frequency around a media item boundary as an example of an event so that opening an input window of finite duration associated with an event means that a high proportion of commands are still received.

In FIGS. 9A to 9D, the same event is analyzed with reference to particular types of commands from a controller application (in FIGS. 9A and 9B) or to voice events (in FIGS. 9C and 9D). The voice input window may be set based on any one of these analyses or by any combination, for example by aggregating all commands received from a controller and voice events.

In some examples, data of the relative timing of commands within a windows, such as the track commands of FIG. 9A and the volume commands of FIG. 9B can be used to adjust a confidence score of an associated keywords.

While FIGS. 9A to 9D are described with reference to a media item boundary as an example of an event, similar distributions of frequency have been observed for other events of the media playback system and it will be appreciated that the voice input window is not limited only to media item boundaries as an event. In some examples, different voice input windows may be set and/or adjusted for each respective event or based on aggregated data for at least two events.

It will be appreciated that an input detection window can be applied to all voice controlled devices and systems to reduce false positives and/or improve privacy. In general most interactions with a voice system have been observed to follow predictable events, such as a user entering a room (so their presence can be detected) and wanting to control items such as media playback in the room, lighting and/or ambient temperature. Similarly it has been observed that users may open a control application to try and achieve a command and then issue a voice command if they cannot find the function in the control application.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:

at least one microphone configured to detect sound;

at least one processor; and data storage having instructions stored thereon that are executed by the at least one processor to cause the playback device to perform operations comprising:

detecting an indication of a track change associated with the playback device, wherein the track change causes the playback device to play back a different item than one currently playing, wherein the indication of the track change is not based on sound data captured via the at least one microphone;

opening, upon the detection of the indication of the track change, an input detection window for a given time period; and during the given time period:

receiving an input sound data stream representing the sound detected by the at least one microphone;

analyzing the input sound data stream for a plurality of keywords supported by the playback device;

determining based on the analysis, that the input sound data stream includes voice input data comprising a keyword, wherein the keyword is one of the plurality of keywords supported by the playback device; and responsive to the determining that the input sound data stream includes voice input data comprising a keyword, causing the playback device or a system comprising the playback device to perform a command corresponding to the keyword.

2. The playback device of claim 1, wherein the indication of the track change is based on a user input to change a track via a controller device.

3. The playback device of claim 1, wherein the operations further comprise:

storing historical data in the data storage, the historical data including detected indications of track changes and any associated commands; and analyzing the historical data to adjust the given time period associated with the input detection window.

4. The playback device of claim 3, wherein analyzing the historical data comprises:

determining a frequency of the associated commands and a time period, relative to a time of the detected indication of the track change, during which the associated commands were received by the playback device; and setting the given time period based on the frequency and the time period.

5. The playback device of claim 3, wherein the given time period is associated with a user account of the playback device or a system comprising the playback device.

6. The playback device of claim 1, wherein outside of the input detection window, the input sound data stream is not analyzed.

7. A method to be performed by a playback device comprising at least one microphone configured to detect sound, the method comprising:

detecting an indication of a track change associated with the playback device, wherein the track change causes the playback device to play back a different item than one currently playing, wherein the indication of the track change is not based on sound data captured via the at least one microphone;

opening, upon the detection of the indication of the track change, an input detection window for a given time period; and during the given time period:

receiving an input sound data stream representing the sound detected by the at least one microphone;

analyzing the input sound data stream for a plurality of keywords supported by the playback device;

determining based on the analysis, that the input sound data stream includes voice input data comprising a keyword, wherein the keyword is one of the plurality of keywords supported by the playback device; and responsive to the determining that the input sound data stream includes voice input data comprising a keyword, causing the playback device or a system comprising the playback device to perform a command corresponding to the keyword.

8. The method of claim 7, wherein the indication is based on a user input to change a track via a controller device.

9. The method of claim 7, further comprising:

storing historical data in data storage of the playback device, the historical data including detected indications of track changes and any associated commands; and analyzing the historical data to adjust the given time period associated with the input detection window.

10. The method of claim 9, wherein analyzing the historical data comprises:

determining a frequency of the associated commands and a time period, relative to a time of the detected indication of the track change, during which the associated commands were received by the playback device; and setting the given time period based on the frequency and the time period.

11. The method of claim 9, wherein the given time period is associated with a user account of the playback device or a system comprising the playback device.

12. The method of claim 7, wherein outside of the input detection window, the input sound data stream is not analyzed.

13. One or more tangible, non-transitory computer-readable media having instructions stored thereon that are executable by one or more processors to cause a playback device to perform operations, the playback device comprising at least one microphone configured to detect sound, the operations comprising:

detecting an indication of a track change associated with the playback device, wherein the track change causes the playback device to play back a different item than one currently playing, wherein the indication of the track change is not based on sound data captured via the at least one microphone;

opening, upon the detection of the indication of the track change, an input detection window for a given time period; and during the given time period:

receiving an input sound data stream representing the sound detected by the at least one microphone; analyzing the input sound data stream for a plurality of keywords supported by the playback device;

determining based on the analysis, that the input sound data stream includes voice input data comprising a keyword, wherein the keyword is one of the plurality of keywords supported by the playback device; and responsive to the determining that the input sound data stream includes voice input data comprising a keyword, causing the playback device or a system comprising the playback device to perform a command corresponding to the keyword.

14. The one or more tangible, non-transitory computer-readable media of claim 13, wherein the indication of the track change is based on a user input to change a track via a controller device.

15. The one or more tangible, non-transitory computer-readable media of claim 13, wherein the operations further comprise:

storing historical data in data storage of the playback device, the historical data including detected indications of track changes and any associated commands; and analyzing the historical data to adjust the given time period associated with the input detection window.

16. The one or more tangible, non-transitory computer-readable media of claim 15, wherein analyzing the historical data comprises:

determining a frequency of the associated commands and a time period, relative to a time of the detected indication of the track change, during which the associated commands were received by the playback device; and setting the given time period based on the frequency and the time period.

17. The one or more tangible, non-transitory computer-readable media of claim 13, wherein outside of the input detection window, the input sound data stream is not analyzed.

* * * * *